(12) United States Patent
Pitts

(10) Patent No.: US 10,412,373 B2
(45) Date of Patent: Sep. 10, 2019

(54) IMAGE CAPTURE FOR VIRTUAL REALITY DISPLAYS

(71) Applicant: GOOGLE LLC, Mountain View, CA (US)

(72) Inventor: Colvin Pitts, Snohomish, WA (US)

(73) Assignee: GOOGLE LLC, Mountain View, CA (US)

(*) Notice: Subject to any disclaimer, the term of this patent is extended or adjusted under 35 U.S.C. 154(b) by 0 days.

(21) Appl. No.: 15/582,237

(22) Filed: Apr. 28, 2017

(65) Prior Publication Data

US 2017/0237971 A1 Aug. 17, 2017

Related U.S. Application Data

(63) Continuation-in-part of application No. 15/084,326, filed on Mar. 29, 2016, now Pat. No. 10,085,005.
(Continued)

(51) Int. Cl.
*H04N 13/00* (2018.01)
*H04N 13/282* (2018.01)
(Continued)

(52) U.S. Cl.
CPC ......... *H04N 13/282* (2018.05); *G06T 15/205* (2013.01); *H04N 5/2254* (2013.01);
(Continued)

(58) Field of Classification Search
CPC .. H04N 13/282; H04N 5/2258; H04N 13/117; H04N 13/232; H04N 13/243;
(Continued)

(56) References Cited

U.S. PATENT DOCUMENTS

| 725,567 A | 4/1903 | Ives |
|---|---|---|
| 4,383,170 A | 5/1983 | Takagi et al. |

(Continued)

FOREIGN PATENT DOCUMENTS

| CN | 101226292 | 7/2008 |
|---|---|---|
| CN | 101309359 | 11/2008 |

(Continued)

OTHER PUBLICATIONS

Nimeroff, J., et al., "Efficient rendering of naturally illuminatied environments" in Fifth Eurographics Workshop on Rendering, 359-373, 1994.
(Continued)

*Primary Examiner* — Yu Chen

(57) ABSTRACT

A light-field camera system such as a tiled camera array may be used to capture a light-field of an environment. The tiled camera array may be a tiered camera array with a first plurality of cameras and a second plurality of cameras that are arranged more densely, but have lower resolution, than those of the first plurality of cameras. The first plurality of cameras may be interspersed among the second plurality of cameras. The first and second pluralities may cooperate to capture the light-field. According to one method, a subview may be captured by each camera of the first and second pluralities. Estimated world properties of the environment may be computed for each subview. A confidence map may be generated to indicate a level of confidence in the estimated world properties for each subview. The confidence maps and subviews may be used to generate a virtual view of the environment.

30 Claims, 15 Drawing Sheets

Related U.S. Application Data

(60) Provisional application No. 62/333,637, filed on May 9, 2016, provisional application No. 62/148,055, filed on Apr. 15, 2015, provisional application No. 62/148,460, filed on Apr. 16, 2015.

(51) Int. Cl.

| | | |
|---|---|---|
| *H04N 13/111* | (2018.01) | |
| *H04N 13/243* | (2018.01) | |
| *H04N 13/275* | (2018.01) | |
| *H04N 13/388* | (2018.01) | |
| *G06T 15/20* | (2011.01) | |
| *H04N 5/225* | (2006.01) | |
| *H04N 13/232* | (2018.01) | |
| *H04N 13/117* | (2018.01) | |
| *H04N 13/25* | (2018.01) | |
| *H04N 13/344* | (2018.01) | |

(52) U.S. Cl.
CPC ......... *H04N 13/111* (2018.05); *H04N 13/117* (2018.05); *H04N 13/232* (2018.05); *H04N 13/243* (2018.05); *H04N 13/25* (2018.05); *H04N 13/275* (2018.05); *H04N 13/388* (2018.05); *G06T 2200/21* (2013.01); *H04N 5/2258* (2013.01); *H04N 13/344* (2018.05)

(58) Field of Classification Search
CPC .. H04N 13/275; H04N 13/111; H04N 13/388; H04N 5/2254; H04N 13/344; G06T 2200/21; G06T 15/205
See application file for complete search history.

(56) References Cited

U.S. PATENT DOCUMENTS

| | | | |
|---|---|---|---|
| 4,661,986 A | 4/1987 | Adelson | |
| 4,694,185 A | 9/1987 | Weiss | |
| 4,920,419 A | 4/1990 | Easterly | |
| 5,076,687 A | 12/1991 | Adelson | |
| 5,077,810 A | 12/1991 | D'Luna | |
| 5,251,019 A | 10/1993 | Moorman et al. | |
| 5,282,045 A | 1/1994 | Mimura et al. | |
| 5,499,069 A | 3/1996 | Griffith | |
| 5,572,034 A | 11/1996 | Karellas | |
| 5,610,390 A | 3/1997 | Miyano | |
| 5,729,471 A | 3/1998 | Jain et al. | |
| 5,748,371 A | 5/1998 | Cathey, Jr. et al. | |
| 5,757,423 A | 5/1998 | Tanaka et al. | |
| 5,818,525 A | 10/1998 | Elabd | |
| 5,835,267 A | 11/1998 | Mason et al. | |
| 5,907,619 A | 5/1999 | Davis | |
| 5,949,433 A | 9/1999 | Klotz | |
| 5,974,215 A | 10/1999 | Bilbro et al. | |
| 6,005,936 A | 12/1999 | Shimizu et al. | |
| 6,021,241 A | 2/2000 | Bilbro et al. | |
| 6,023,523 A | 2/2000 | Cohen et al. | |
| 6,028,606 A | 2/2000 | Kolb et al. | |
| 6,034,690 A | 3/2000 | Gallery et al. | |
| 6,061,083 A | 5/2000 | Aritake et al. | |
| 6,061,400 A | 5/2000 | Pearlstein et al. | |
| 6,069,565 A | 5/2000 | Stern et al. | |
| 6,075,889 A | 6/2000 | Hamilton, Jr. et al. | |
| 6,084,979 A | 7/2000 | Kanade et al. | |
| 6,091,860 A | 7/2000 | Dimitri | |
| 6,097,394 A | 8/2000 | Levoy et al. | |
| 6,115,556 A | 9/2000 | Reddington | |
| 6,137,100 A | 10/2000 | Fossum et al. | |
| 6,169,285 B1 | 1/2001 | Pertrillo et al. | |
| 6,201,899 B1 | 3/2001 | Bergen | |
| 6,221,687 B1 | 4/2001 | Abramovich | |
| 6,320,979 B1 | 11/2001 | Melen | |
| 6,424,351 B1 | 7/2002 | Bishop et al. | |
| 6,448,544 B1 | 9/2002 | Stanton et al. | |
| 6,466,207 B1 | 10/2002 | Gortler et al. | |
| 6,476,805 B1 | 11/2002 | Shum et al. | |
| 6,479,827 B1 | 11/2002 | Hamamoto et al. | |
| 6,483,535 B1 | 11/2002 | Tamburrino et al. | |
| 6,529,265 B1 | 3/2003 | Henningsen | |
| 6,577,342 B1 | 6/2003 | Webster | |
| 6,587,147 B1 | 7/2003 | Li | |
| 6,597,859 B1 | 7/2003 | Leinhardt et al. | |
| 6,606,099 B2 | 8/2003 | Yamada | |
| 6,658,168 B1 | 12/2003 | Kim | |
| 6,674,430 B1 | 1/2004 | Kaufman et al. | |
| 6,680,976 B1 | 1/2004 | Chen et al. | |
| 6,687,419 B1 | 2/2004 | Atkin | |
| 6,697,062 B1* | 2/2004 | Cabral | G06T 15/04 345/419 |
| 6,768,980 B1 | 7/2004 | Meyer et al. | |
| 6,785,667 B2 | 8/2004 | Orbanes et al. | |
| 6,833,865 B1 | 12/2004 | Fuller et al. | |
| 6,842,297 B2 | 1/2005 | Dowski, Jr. et al. | |
| 6,900,841 B1 | 5/2005 | Mihara | |
| 6,924,841 B2 | 8/2005 | Jones | |
| 6,927,922 B2 | 8/2005 | George et al. | |
| 7,015,954 B1 | 3/2006 | Foote et al. | |
| 7,025,515 B2 | 4/2006 | Woods | |
| 7,034,866 B1 | 4/2006 | Colmenarez et al. | |
| 7,079,698 B2 | 7/2006 | Kobayashi | |
| 7,102,666 B2 | 9/2006 | Kanade et al. | |
| 7,164,807 B2 | 1/2007 | Morton | |
| 7,206,022 B2 | 4/2007 | Miller et al. | |
| 7,239,345 B1 | 7/2007 | Rogina | |
| 7,286,295 B1 | 10/2007 | Sweatt et al. | |
| 7,304,670 B1 | 12/2007 | Hussey et al. | |
| 7,329,856 B2 | 2/2008 | Ma et al. | |
| 7,336,430 B2 | 2/2008 | George | |
| 7,417,670 B1 | 8/2008 | Linzer et al. | |
| 7,469,381 B2 | 12/2008 | Ording | |
| 7,477,304 B2 | 1/2009 | Hu | |
| 7,587,109 B1 | 9/2009 | Reininger | |
| 7,620,309 B2 | 11/2009 | Georgiev | |
| 7,623,726 B1 | 11/2009 | Georgiev | |
| 7,633,513 B2 | 12/2009 | Kondo et al. | |
| 7,683,951 B2 | 3/2010 | Aotsuka | |
| 7,687,757 B1 | 3/2010 | Tseng et al. | |
| 7,723,662 B2 | 5/2010 | Levoy et al. | |
| 7,724,952 B2 | 5/2010 | Shum et al. | |
| 7,748,022 B1 | 6/2010 | Frazier | |
| 7,847,825 B2 | 12/2010 | Aoki et al. | |
| 7,936,377 B2 | 5/2011 | Friedhoff et al. | |
| 7,936,392 B2 | 5/2011 | Ng et al. | |
| 7,941,634 B2 | 5/2011 | Georgi | |
| 7,945,653 B2 | 5/2011 | Zuckerberg et al. | |
| 7,949,252 B1 | 5/2011 | Georgiev | |
| 7,982,776 B2 | 7/2011 | Dunki-Jacobs et al. | |
| 8,013,904 B2 | 9/2011 | Tan et al. | |
| 8,085,391 B2 | 12/2011 | Machida et al. | |
| 8,106,856 B2 | 1/2012 | Matas et al. | |
| 8,115,814 B2 | 2/2012 | Iwase et al. | |
| 8,155,456 B2 | 4/2012 | Babacan | |
| 8,155,478 B2 | 4/2012 | Vitsnudel et al. | |
| 8,189,089 B1 | 5/2012 | Georgiev et al. | |
| 8,228,417 B1 | 7/2012 | Georgiev et al. | |
| 8,248,515 B2 | 8/2012 | Ng et al. | |
| 8,259,198 B2 | 9/2012 | Cote et al. | |
| 8,264,546 B2 | 9/2012 | Witt | |
| 8,279,325 B2 | 10/2012 | Pitts et al. | |
| 8,289,440 B2 | 10/2012 | Knight et al. | |
| 8,290,358 B1 | 10/2012 | Georgiev | |
| 8,310,554 B2 | 11/2012 | Aggarwal et al. | |
| 8,315,476 B1 | 11/2012 | Georgiev et al. | |
| 8,345,144 B1 | 1/2013 | Georgiev et al. | |
| 8,400,533 B1 | 3/2013 | Szedo | |
| 8,400,555 B1 | 3/2013 | Georgiev et al. | |
| 8,427,548 B2 | 4/2013 | Lim et al. | |
| 8,442,397 B2 | 5/2013 | Kang et al. | |
| 8,446,516 B2 | 5/2013 | Pitts et al. | |
| 8,494,304 B2 | 7/2013 | Venable et al. | |
| 8,531,581 B2 | 9/2013 | Shroff | |
| 8,542,933 B2 | 9/2013 | Venkataraman et al. | |
| 8,559,705 B2 | 10/2013 | Ng | |

(56) References Cited

U.S. PATENT DOCUMENTS

| | | |
|---|---|---|
| 8,570,426 B2 | 10/2013 | Pitts et al. |
| 8,577,216 B2 | 11/2013 | Li et al. |
| 8,581,998 B2 | 11/2013 | Ohno |
| 8,589,374 B2 | 11/2013 | Chaudhri |
| 8,593,564 B2 | 11/2013 | Border et al. |
| 8,605,199 B2 | 12/2013 | Imai |
| 8,614,764 B2 | 12/2013 | Pitts et al. |
| 8,619,082 B1 * | 12/2013 | Ciurea .................. H04N 13/232 345/427 |
| 8,629,930 B2 | 1/2014 | Brueckner et al. |
| 8,665,440 B1 | 3/2014 | Kompaniets et al. |
| 8,675,073 B2 | 3/2014 | Aagaard et al. |
| 8,724,014 B2 | 5/2014 | Ng et al. |
| 8,736,710 B2 | 5/2014 | Spielberg |
| 8,736,751 B2 | 5/2014 | Yun |
| 8,749,620 B1 | 6/2014 | Pitts et al. |
| 8,750,509 B2 | 6/2014 | Renkis |
| 8,754,829 B2 | 6/2014 | Lapstun |
| 8,760,566 B2 | 6/2014 | Pitts et al. |
| 8,768,102 B1 | 7/2014 | Ng et al. |
| 8,797,321 B1 | 8/2014 | Bertolami et al. |
| 8,811,769 B1 | 8/2014 | Pitts et al. |
| 8,831,377 B2 | 9/2014 | Pitts et al. |
| 8,848,970 B2 | 9/2014 | Aller et al. |
| 8,860,856 B2 | 10/2014 | Wetsztein et al. |
| 8,879,901 B2 | 11/2014 | Caldwell et al. |
| 8,903,232 B1 | 12/2014 | Caldwell |
| 8,908,058 B2 | 12/2014 | Akeley et al. |
| 8,948,545 B2 | 2/2015 | Akeley et al. |
| 8,953,882 B2 | 2/2015 | Lim et al. |
| 8,971,625 B2 | 3/2015 | Pitts et al. |
| 8,976,288 B2 | 3/2015 | Ng et al. |
| 8,988,317 B1 * | 3/2015 | Liang .................... G06T 15/00 345/32 |
| 8,995,785 B2 | 3/2015 | Knight et al. |
| 8,997,021 B2 | 3/2015 | Liang et al. |
| 9,001,226 B1 | 4/2015 | Ng et al. |
| 9,013,611 B1 | 4/2015 | Szedo |
| 9,106,914 B2 | 8/2015 | Doser |
| 9,184,199 B2 | 11/2015 | Pitts et al. |
| 9,201,142 B2 | 12/2015 | Antao |
| 9,201,193 B1 | 12/2015 | Smith |
| 9,210,391 B1 | 12/2015 | Mills |
| 9,214,013 B2 | 12/2015 | Venkataraman et al. |
| 9,262,067 B1 | 2/2016 | Bell et al. |
| 9,294,662 B2 | 3/2016 | Vondran, Jr. et al. |
| 9,300,932 B2 | 3/2016 | Knight et al. |
| 9,305,375 B2 | 4/2016 | Akeley |
| 9,305,956 B2 | 4/2016 | Pittes et al. |
| 9,386,288 B2 | 7/2016 | Akeley et al. |
| 9,392,153 B2 | 7/2016 | Myhre et al. |
| 9,419,049 B2 | 8/2016 | Pitts et al. |
| 9,467,607 B2 | 10/2016 | Ng et al. |
| 9,497,380 B1 | 11/2016 | Jannard et al. |
| 9,607,424 B2 | 3/2017 | Ng et al. |
| 9,628,684 B2 | 4/2017 | Liang et al. |
| 9,635,332 B2 | 4/2017 | Carroll et al. |
| 9,639,945 B2 | 5/2017 | Oberheu et al. |
| 9,647,150 B2 | 5/2017 | Blasco Claret |
| 9,681,069 B2 | 6/2017 | El-Ghoroury et al. |
| 9,774,800 B2 | 9/2017 | El-Ghoroury et al. |
| 9,858,649 B2 | 1/2018 | Liang et al. |
| 9,866,810 B2 | 1/2018 | Knight et al. |
| 9,900,510 B1 | 2/2018 | Karafin et al. |
| 9,979,909 B2 | 5/2018 | Kuang et al. |
| 10,244,266 B1 | 3/2019 | Wu |
| 2001/0048968 A1 | 12/2001 | Cox et al. |
| 2001/0053202 A1 | 12/2001 | Mazess et al. |
| 2002/0001395 A1 | 1/2002 | Davis et al. |
| 2002/0015048 A1 | 2/2002 | Mister |
| 2002/0061131 A1 | 5/2002 | Sawhney |
| 2002/0109783 A1 | 8/2002 | Hayashi et al. |
| 2002/0159030 A1 | 10/2002 | Frey et al. |
| 2002/0199106 A1 | 12/2002 | Hayashi |
| 2003/0043270 A1 | 3/2003 | Rafey |
| 2003/0081145 A1 | 5/2003 | Seaman et al. |
| 2003/0103670 A1 | 6/2003 | Schoelkopf et al. |
| 2003/0117511 A1 | 6/2003 | Belz et al. |
| 2003/0123700 A1 | 7/2003 | Wakao |
| 2003/0133018 A1 | 7/2003 | Ziemkowski |
| 2003/0147252 A1 | 8/2003 | Fioravanti |
| 2003/0156077 A1 | 8/2003 | Balogh |
| 2003/0172131 A1 | 9/2003 | Ao |
| 2004/0002179 A1 | 1/2004 | Barton et al. |
| 2004/0012688 A1 | 1/2004 | Tinnerino |
| 2004/0012689 A1 | 1/2004 | Tinnerino |
| 2004/0101166 A1 | 5/2004 | Williams et al. |
| 2004/0114176 A1 | 6/2004 | Bodin et al. |
| 2004/0135780 A1 | 7/2004 | Mims |
| 2004/0189686 A1 | 9/2004 | Tanguay et al. |
| 2004/0212725 A1 * | 10/2004 | Raskar .................... G06T 15/02 348/370 |
| 2004/0257360 A1 | 12/2004 | Sieckmann |
| 2005/0031203 A1 | 2/2005 | Fukuda |
| 2005/0049500 A1 | 3/2005 | Babu et al. |
| 2005/0052543 A1 | 3/2005 | Li et al. |
| 2005/0080602 A1 | 4/2005 | Snyder et al. |
| 2005/0141881 A1 | 6/2005 | Taira et al. |
| 2005/0162540 A1 | 7/2005 | Yata |
| 2005/0212918 A1 | 9/2005 | Serra et al. |
| 2005/0253728 A1 | 11/2005 | Chen et al. |
| 2005/0276441 A1 | 12/2005 | Debevec |
| 2006/0023066 A1 | 2/2006 | Li et al. |
| 2006/0050170 A1 | 3/2006 | Tanaka |
| 2006/0056040 A1 | 3/2006 | Lan |
| 2006/0056604 A1 | 3/2006 | Sylthe et al. |
| 2006/0072175 A1 | 4/2006 | Oshino |
| 2006/0078052 A1 | 4/2006 | Dang |
| 2006/0082879 A1 | 4/2006 | Miyoshi et al. |
| 2006/0130017 A1 | 6/2006 | Cohen et al. |
| 2006/0208259 A1 | 9/2006 | Jeon |
| 2006/0248348 A1 | 11/2006 | Wakao et al. |
| 2006/0250322 A1 | 11/2006 | Hall et al. |
| 2006/0256226 A1 | 11/2006 | Alon et al. |
| 2006/0274210 A1 | 12/2006 | Kim |
| 2006/0285741 A1 | 12/2006 | Subbarao |
| 2007/0008317 A1 | 1/2007 | Lundstrom |
| 2007/0019883 A1 | 1/2007 | Wong et al. |
| 2007/0030357 A1 | 2/2007 | Levien et al. |
| 2007/0033588 A1 | 2/2007 | Landsman |
| 2007/0052810 A1 | 3/2007 | Monroe |
| 2007/0071316 A1 | 3/2007 | Kubo |
| 2007/0081081 A1 | 4/2007 | Cheng |
| 2007/0097206 A1 | 5/2007 | Houvener |
| 2007/0103558 A1 | 5/2007 | Cai et al. |
| 2007/0113198 A1 | 5/2007 | Robertson et al. |
| 2007/0140676 A1 | 6/2007 | Nakahara |
| 2007/0188613 A1 | 8/2007 | Norbori et al. |
| 2007/0201853 A1 | 8/2007 | Petschnigg |
| 2007/0229653 A1 | 10/2007 | Matusik et al. |
| 2007/0230944 A1 | 10/2007 | Georgiev |
| 2007/0269108 A1 | 11/2007 | Steinberg et al. |
| 2007/0273795 A1 | 11/2007 | Jaynes |
| 2008/0007626 A1 | 1/2008 | Wernersson |
| 2008/0012988 A1 | 1/2008 | Baharav et al. |
| 2008/0018668 A1 | 1/2008 | Yamauchi |
| 2008/0031537 A1 | 2/2008 | Gutkowicz-Krusin et al. |
| 2008/0049113 A1 | 2/2008 | Hirai |
| 2008/0056569 A1 | 3/2008 | Williams et al. |
| 2008/0122940 A1 | 5/2008 | Mori |
| 2008/0129728 A1 | 6/2008 | Satoshi |
| 2008/0144952 A1 | 6/2008 | Chen et al. |
| 2008/0152215 A1 | 6/2008 | Horie et al. |
| 2008/0168404 A1 | 7/2008 | Ording |
| 2008/0180792 A1 | 7/2008 | Georgiev |
| 2008/0187305 A1 | 8/2008 | Raskar et al. |
| 2008/0193026 A1 | 8/2008 | Horie et al. |
| 2008/0205871 A1 | 8/2008 | Utagawa |
| 2008/0226274 A1 | 9/2008 | Spielberg |
| 2008/0232680 A1 | 9/2008 | Berestov et al. |
| 2008/0253652 A1 | 10/2008 | Gupta et al. |
| 2008/0260291 A1 | 10/2008 | Alakarhu et al. |
| 2008/0266688 A1 | 10/2008 | Errando Smet et al. |
| 2008/0277566 A1 | 11/2008 | Utagawa |

(56) References Cited

U.S. PATENT DOCUMENTS

| | | |
|---|---|---|
| 2008/0309813 A1 | 12/2008 | Watanabe |
| 2008/0316301 A1 | 12/2008 | Givon |
| 2009/0027542 A1 | 1/2009 | Yamamoto et al. |
| 2009/0041381 A1 | 2/2009 | Georgiev et al. |
| 2009/0041448 A1 | 2/2009 | Georgiev et al. |
| 2009/0070710 A1 | 3/2009 | Kagaya |
| 2009/0102956 A1 | 4/2009 | Georgiev |
| 2009/0109280 A1 | 4/2009 | Gotsman |
| 2009/0128658 A1 | 5/2009 | Hayasaka et al. |
| 2009/0128669 A1 | 5/2009 | Ng et al. |
| 2009/0135258 A1 | 5/2009 | Nozaki |
| 2009/0140131 A1 | 6/2009 | Utagawa |
| 2009/0167909 A1 | 7/2009 | Imagawa et al. |
| 2009/0185051 A1 | 7/2009 | Sano |
| 2009/0185801 A1 | 7/2009 | Georgiev et al. |
| 2009/0190022 A1 | 7/2009 | Ichimura |
| 2009/0190024 A1 | 7/2009 | Hayasaka et al. |
| 2009/0195689 A1 | 8/2009 | Hwang et al. |
| 2009/0202235 A1 | 8/2009 | Li et al. |
| 2009/0204813 A1 | 8/2009 | Kwan |
| 2009/0207233 A1 | 8/2009 | Mauchly et al. |
| 2009/0273843 A1 | 11/2009 | Raskar et al. |
| 2009/0290848 A1 | 11/2009 | Brown |
| 2009/0295829 A1 | 12/2009 | Georgiev et al. |
| 2009/0309973 A1 | 12/2009 | Kogane |
| 2009/0309975 A1 | 12/2009 | Gordon |
| 2009/0310885 A1 | 12/2009 | Tamaru |
| 2009/0321861 A1 | 12/2009 | Oliver et al. |
| 2010/0003024 A1 | 1/2010 | Agrawal et al. |
| 2010/0011117 A1 | 1/2010 | Hristodorescu et al. |
| 2010/0021001 A1 | 1/2010 | Honsinger et al. |
| 2010/0026852 A1 | 2/2010 | Ng et al. |
| 2010/0050120 A1 | 2/2010 | Ohazama et al. |
| 2010/0060727 A1 | 3/2010 | Steinberg et al. |
| 2010/0097444 A1 | 4/2010 | Lablans |
| 2010/0103311 A1 | 4/2010 | Makii |
| 2010/0107068 A1 | 4/2010 | Butcher et al. |
| 2010/0111489 A1 | 5/2010 | Presler |
| 2010/0123784 A1 | 5/2010 | Ding et al. |
| 2010/0141780 A1 | 6/2010 | Tan et al. |
| 2010/0141802 A1* | 6/2010 | Knight ............... H04N 5/23212 348/240.3 |
| 2010/0142839 A1 | 6/2010 | Lakus-Becker |
| 2010/0201789 A1 | 8/2010 | Yahagi |
| 2010/0253782 A1 | 10/2010 | Elazary |
| 2010/0265385 A1 | 10/2010 | Knight et al. |
| 2010/0277629 A1 | 11/2010 | Tanaka |
| 2010/0303288 A1 | 12/2010 | Malone |
| 2010/0328485 A1 | 12/2010 | Imamura et al. |
| 2011/0018903 A1 | 1/2011 | Lapstun et al. |
| 2011/0019056 A1 | 1/2011 | Hirsch et al. |
| 2011/0025827 A1 | 2/2011 | Shpunt et al. |
| 2011/0032338 A1 | 2/2011 | Raveendran et al. |
| 2011/0050864 A1 | 3/2011 | Bond |
| 2011/0050909 A1 | 3/2011 | Ellenby |
| 2011/0063414 A1 | 3/2011 | Chen et al. |
| 2011/0069175 A1 | 3/2011 | Mistretta et al. |
| 2011/0075729 A1 | 3/2011 | Dane et al. |
| 2011/0090255 A1 | 4/2011 | Wilson et al. |
| 2011/0123183 A1 | 5/2011 | Adelsberger et al. |
| 2011/0129120 A1 | 6/2011 | Chan |
| 2011/0129165 A1 | 6/2011 | Lim et al. |
| 2011/0148764 A1 | 6/2011 | Gao |
| 2011/0149074 A1 | 6/2011 | Lee et al. |
| 2011/0169994 A1 | 7/2011 | DiFrancesco et al. |
| 2011/0194617 A1 | 8/2011 | Kumar et al. |
| 2011/0205384 A1 | 8/2011 | Zamowski et al. |
| 2011/0221947 A1 | 9/2011 | Awazu |
| 2011/0242334 A1 | 10/2011 | Wilburn et al. |
| 2011/0242352 A1 | 10/2011 | Hikosaka |
| 2011/0261164 A1 | 10/2011 | Olesen et al. |
| 2011/0261205 A1 | 10/2011 | Sun |
| 2011/0267263 A1 | 11/2011 | Hinckley |
| 2011/0273466 A1 | 11/2011 | Imai et al. |
| 2011/0279479 A1 | 11/2011 | Rodriguez |
| 2011/0133649 A1 | 12/2011 | Bales et al. |
| 2011/0292258 A1 | 12/2011 | Adler et al. |
| 2011/0298960 A1 | 12/2011 | Tan et al. |
| 2011/0304745 A1 | 12/2011 | Wang et al. |
| 2011/0311046 A1 | 12/2011 | Oka |
| 2011/0316968 A1 | 12/2011 | Taguchi et al. |
| 2012/0014837 A1 | 1/2012 | Fehr et al. |
| 2012/0044330 A1 | 2/2012 | Watanabe |
| 2012/0050562 A1 | 3/2012 | Perwass et al. |
| 2012/0056889 A1 | 3/2012 | Carter et al. |
| 2012/0056982 A1* | 3/2012 | Katz ..................... G06F 3/017 348/43 |
| 2012/0057040 A1 | 3/2012 | Park et al. |
| 2012/0057806 A1 | 3/2012 | Backlund et al. |
| 2012/0062755 A1 | 3/2012 | Takahashi et al. |
| 2012/0120240 A1 | 5/2012 | Muramatsu et al. |
| 2012/0132803 A1 | 5/2012 | Hirato et al. |
| 2012/0133746 A1 | 5/2012 | Bigioi et al. |
| 2012/0147205 A1 | 6/2012 | Lelescu et al. |
| 2012/0176481 A1 | 7/2012 | Lukk et al. |
| 2012/0183055 A1 | 7/2012 | Hong et al. |
| 2012/0188344 A1 | 7/2012 | Imai |
| 2012/0201475 A1 | 8/2012 | Carmel et al. |
| 2012/0206574 A1 | 8/2012 | Shikata et al. |
| 2012/0218463 A1 | 8/2012 | Benezra et al. |
| 2012/0224787 A1 | 9/2012 | Imai |
| 2012/0229691 A1 | 9/2012 | Hiasa et al. |
| 2012/0249529 A1 | 10/2012 | Matsumoto et al. |
| 2012/0249550 A1 | 10/2012 | Akeley |
| 2012/0249819 A1 | 10/2012 | Imai |
| 2012/0251131 A1 | 10/2012 | Henderson et al. |
| 2012/0257065 A1 | 10/2012 | Velarde et al. |
| 2012/0257795 A1 | 10/2012 | Kim et al. |
| 2012/0268367 A1 | 10/2012 | Vertegaal et al. |
| 2012/0269274 A1 | 10/2012 | Kim et al. |
| 2012/0272271 A1 | 10/2012 | Nishizawa et al. |
| 2012/0287246 A1 | 11/2012 | Katayama |
| 2012/0287296 A1 | 11/2012 | Fukui |
| 2012/0287329 A1 | 11/2012 | Yahata |
| 2012/0287075 A1 | 11/2012 | Engelen et al. |
| 2012/0300091 A1 | 11/2012 | Shroff et al. |
| 2012/0237222 A9 | 12/2012 | Ng et al. |
| 2012/0321172 A1* | 12/2012 | Jachalsky ............... G06T 7/593 382/154 |
| 2013/0002902 A1 | 1/2013 | Ito |
| 2013/0002936 A1 | 1/2013 | Hirama et al. |
| 2013/0021486 A1 | 1/2013 | Richardson |
| 2013/0038696 A1 | 2/2013 | Ding et al. |
| 2013/0041215 A1 | 2/2013 | McDowall |
| 2013/0044290 A1 | 2/2013 | Kawamura |
| 2013/0050546 A1 | 2/2013 | Kano |
| 2013/0064453 A1 | 3/2013 | Nagasaka et al. |
| 2013/0064532 A1 | 3/2013 | Caldwell et al. |
| 2013/0070059 A1 | 3/2013 | Kushida |
| 2013/0070060 A1 | 3/2013 | Chatterjee et al. |
| 2013/0077880 A1 | 3/2013 | Venkataraman et al. |
| 2013/0082905 A1 | 4/2013 | Ranieri et al. |
| 2013/0088616 A1 | 4/2013 | Ingrassia, Jr. |
| 2013/0093844 A1 | 4/2013 | Shuto |
| 2013/0093859 A1 | 4/2013 | Nakamura |
| 2013/0094101 A1 | 4/2013 | Oguchi |
| 2013/0107085 A1 | 5/2013 | Ng et al. |
| 2013/0113981 A1 | 5/2013 | Knight et al. |
| 2013/0120356 A1 | 5/2013 | Georgiev et al. |
| 2013/0120605 A1 | 5/2013 | Georgiev et al. |
| 2013/0120636 A1 | 5/2013 | Baer |
| 2013/0127901 A1 | 5/2013 | Georgiev et al. |
| 2013/0128052 A1 | 5/2013 | Catrein et al. |
| 2013/0128081 A1 | 5/2013 | Georgiev et al. |
| 2013/0128087 A1 | 5/2013 | Georgiev et al. |
| 2013/0135448 A1 | 5/2013 | Nagumo et al. |
| 2013/0176481 A1 | 7/2013 | Holmes et al. |
| 2013/0188068 A1 | 7/2013 | Said |
| 2013/0215108 A1 | 8/2013 | McMahon et al. |
| 2013/0215226 A1 | 8/2013 | Chauvier et al. |
| 2013/0222656 A1 | 8/2013 | Kaneko |
| 2013/0234935 A1 | 9/2013 | Griffith |
| 2013/0242137 A1 | 9/2013 | Kirkland |
| 2013/0243391 A1 | 9/2013 | Park et al. |

(56) References Cited

U.S. PATENT DOCUMENTS

| | | |
|---|---|---|
| 2013/0258451 A1 | 10/2013 | El-Ghoroury et al. |
| 2013/0262511 A1 | 10/2013 | Kuffner et al. |
| 2013/0286236 A1 | 10/2013 | Mankowski |
| 2013/0321574 A1 | 12/2013 | Zhang et al. |
| 2013/0321581 A1 | 12/2013 | El-Ghoroury |
| 2013/0321677 A1 | 12/2013 | Cote et al. |
| 2013/0329107 A1 | 12/2013 | Burley et al. |
| 2013/0329132 A1 | 12/2013 | Tico et al. |
| 2013/0335596 A1 | 12/2013 | Demandoix et al. |
| 2013/0342700 A1 | 12/2013 | Kass |
| 2014/0002502 A1 | 1/2014 | Han |
| 2014/0002699 A1 | 1/2014 | Guan |
| 2014/0003719 A1 | 1/2014 | Bai et al. |
| 2014/0013273 A1 | 1/2014 | Ng |
| 2014/0035959 A1 | 2/2014 | Lapstun |
| 2014/0037280 A1 | 2/2014 | Shirakawa |
| 2014/0049663 A1 | 2/2014 | Ng et al. |
| 2014/0059462 A1 | 2/2014 | Wernersson |
| 2014/0085282 A1 | 3/2014 | Luebke et al. |
| 2014/0092424 A1 | 4/2014 | Grosz |
| 2014/0098191 A1 | 4/2014 | Rime et al. |
| 2014/0132741 A1 | 5/2014 | Aagaard et al. |
| 2014/0133749 A1 | 5/2014 | Kuo et al. |
| 2014/0139538 A1 | 5/2014 | Barber et al. |
| 2014/0167196 A1 | 6/2014 | Heimgartner et al. |
| 2014/0176540 A1 | 6/2014 | Tosio et al. |
| 2014/0176592 A1 | 6/2014 | Wilburn et al. |
| 2014/0176710 A1 | 6/2014 | Brady et al. |
| 2014/0177905 A1 | 6/2014 | Grefalda |
| 2014/0184885 A1 | 7/2014 | Tanaka et al. |
| 2014/0192208 A1 | 7/2014 | Okincha |
| 2014/0193047 A1 | 7/2014 | Grosz |
| 2014/0195921 A1 | 7/2014 | Grosz |
| 2014/0204111 A1 | 7/2014 | Vaidyanathan et al. |
| 2014/0211077 A1 | 7/2014 | Ng et al. |
| 2014/0218540 A1 | 8/2014 | Geiss et al. |
| 2014/0226038 A1 | 8/2014 | Kimura |
| 2014/0240463 A1 | 8/2014 | Pitts et al. |
| 2014/0240578 A1 | 8/2014 | Fishman et al. |
| 2014/0245367 A1 | 8/2014 | Sasaki |
| 2014/0267243 A1 | 9/2014 | Venkataraman et al. |
| 2014/0267639 A1 | 9/2014 | Tatsuta |
| 2014/0300753 A1 | 10/2014 | Yin |
| 2014/0313350 A1 | 10/2014 | Keelan |
| 2014/0313375 A1 | 10/2014 | Milnar |
| 2014/0333787 A1 | 11/2014 | Venkataraman |
| 2014/0340390 A1 | 11/2014 | Lanman et al. |
| 2014/0347540 A1 | 11/2014 | Kang |
| 2014/0354863 A1 | 12/2014 | Ahn et al. |
| 2014/0368494 A1 | 12/2014 | Sakharnykh et al. |
| 2014/0368640 A1 | 12/2014 | Strandemar et al. |
| 2015/0029386 A1 | 1/2015 | Pitts et al. |
| 2015/0042767 A1* | 2/2015 | Ciurea ............ H04N 13/232 348/48 |
| 2015/0049915 A1* | 2/2015 | Ciurea ............ H04N 13/232 382/106 |
| 2015/0062178 A1 | 3/2015 | Matas et al. |
| 2015/0062386 A1 | 3/2015 | Sugawara |
| 2015/0092071 A1 | 4/2015 | Meng et al. |
| 2015/0097985 A1 | 4/2015 | Akeley |
| 2015/0161798 A1* | 6/2015 | Venkataraman ...... G01P 3/38 348/47 |
| 2015/0193937 A1 | 7/2015 | Georgiev et al. |
| 2015/0206340 A1 | 7/2015 | Munkberg et al. |
| 2015/0207990 A1 | 7/2015 | Ford et al. |
| 2015/0223731 A1 | 8/2015 | Sahin |
| 2015/0237273 A1 | 8/2015 | Sawadaishi |
| 2015/0264337 A1* | 9/2015 | Venkataraman ...... G01P 3/38 348/47 |
| 2015/0104101 A1 | 10/2015 | Bryant et al. |
| 2015/0304667 A1 | 10/2015 | Suehring et al. |
| 2015/0310592 A1 | 10/2015 | Kano |
| 2015/0312553 A1 | 10/2015 | Ng et al. |
| 2015/0312593 A1 | 10/2015 | Akeley et al. |
| 2015/0334420 A1 | 11/2015 | De Vleeschauwer et al. |
| 2015/0346832 A1 | 12/2015 | Cole et al. |
| 2015/0370011 A1 | 12/2015 | Ishihara |
| 2015/0370012 A1 | 12/2015 | Ishihara |
| 2015/0373279 A1 | 12/2015 | Osborne |
| 2016/0029002 A1 | 1/2016 | Balko |
| 2016/0029017 A1 | 1/2016 | Liang |
| 2016/0037178 A1 | 2/2016 | Lee et al. |
| 2016/0065931 A1 | 3/2016 | Konieczny |
| 2016/0065947 A1 | 3/2016 | Cole et al. |
| 2016/0142615 A1 | 5/2016 | Liang |
| 2016/0155215 A1 | 6/2016 | Suzuki |
| 2016/0165206 A1 | 6/2016 | Huang et al. |
| 2016/0173844 A1 | 6/2016 | Knight et al. |
| 2016/0182893 A1* | 6/2016 | Wan ................ G06T 7/593 348/50 |
| 2016/0191823 A1 | 6/2016 | El-Ghoroury |
| 2016/0227244 A1 | 8/2016 | Rosewarne |
| 2016/0247324 A1 | 8/2016 | Mullins et al. |
| 2016/0253837 A1 | 9/2016 | Zhu et al. |
| 2016/0269620 A1 | 9/2016 | Romanenko et al. |
| 2016/0307368 A1 | 10/2016 | Akeley |
| 2016/0307372 A1 | 10/2016 | Pitts et al. |
| 2016/0309065 A1 | 10/2016 | Karafin et al. |
| 2016/0337635 A1* | 11/2016 | Nisenzon ........ H04N 13/271 |
| 2016/0353026 A1 | 12/2016 | Blonde et al. |
| 2016/0381348 A1 | 12/2016 | Hayasaka et al. |
| 2017/0059305 A1 | 3/2017 | Nonn et al. |
| 2017/0067832 A1 | 3/2017 | Ferrara, Jr. et al. |
| 2017/0094906 A1 | 3/2017 | Liang et al. |
| 2017/0134639 A1 | 5/2017 | Pitts et al. |
| 2017/0139131 A1 | 5/2017 | Karafin et al. |
| 2017/0221226 A1 | 8/2017 | Shen |
| 2017/0237971 A1 | 8/2017 | Pitts et al. |
| 2017/0243373 A1 | 8/2017 | Bevensee et al. |
| 2017/0244948 A1 | 8/2017 | Pang et al. |
| 2017/0256036 A1 | 9/2017 | Song et al. |
| 2017/0263012 A1 | 9/2017 | Sabater et al. |
| 2017/0302903 A1 | 10/2017 | Ng et al. |
| 2017/0316602 A1* | 11/2017 | Smirnov ............ G06T 3/0068 |
| 2017/0358092 A1 | 12/2017 | Bleibel et al. |
| 2017/0365068 A1 | 12/2017 | Tan et al. |
| 2017/0374411 A1 | 12/2017 | Lederer et al. |
| 2018/0012397 A1 | 1/2018 | Carothers |
| 2018/0020204 A1 | 1/2018 | Pang et al. |
| 2018/0024753 A1 | 1/2018 | Gewickey et al. |
| 2018/0033209 A1 | 2/2018 | Akeley et al. |
| 2018/0034134 A1 | 2/2018 | Pang et al. |
| 2018/0070066 A1 | 3/2018 | Knight et al. |
| 2018/0070067 A1 | 3/2018 | Knight et al. |
| 2018/0082405 A1 | 3/2018 | Liang |
| 2018/0089903 A1 | 3/2018 | Pang et al. |
| 2018/0097867 A1 | 4/2018 | Pang et al. |
| 2018/0124371 A1* | 5/2018 | Kamal ............ G01B 11/00 |
| 2018/0139436 A1* | 5/2018 | Yucer ............ G06T 7/564 |
| 2018/0158198 A1 | 6/2018 | Kamad |
| 2018/0199039 A1 | 7/2018 | Trepte |

FOREIGN PATENT DOCUMENTS

| | | |
|---|---|---|
| DE | 19624421 | 1/1997 |
| JP | 2010020100 | 1/2010 |
| JP | 2011135170 | 7/2011 |
| KR | 10-2011-0074984 | 7/2011 |
| WO | 2003052465 | 6/2003 |
| WO | 2006039486 | 4/2006 |
| WO | 2007092545 | 8/2007 |
| WO | 2007092581 | 8/2007 |
| WO | 2011010234 | 3/2011 |
| WO | 2011029209 | 3/2011 |
| WO | 2011081187 | 7/2011 |

OTHER PUBLICATIONS

Nokia, "City Lens", May 2012.
Ogden, J., "Pyramid-Based Computer Graphics", 1985.
Okano et al., "Three-dimensional video system based on integral photography" Optical Engineering, Jun. 1999. vol. 38, No. 6, pp. 1072-1077.

(56) References Cited

OTHER PUBLICATIONS

Orzan, Alexandrina, et al., "Diffusion Curves: A Vector Representation for Smooth-Shaded Images," ACM Transactions on Graphics—Proceedings of SIGGRAPH 2008; vol. 27; 2008.
Pain, B., "Back-Side Illumination Technology for SOI-CMOS Image Sensors", 2009.
Perez, Patrick et al., "Poisson Image Editing," ACM Transactions on Graphics—Proceedings of ACM SIGGRAPH 2003; vol. 22, Issue 3; Jul. 2003; pp. 313-318.
Petschnigg, George, et al., "Digial Photography with Flash and No-Flash Image Pairs", SIGGRAPH 2004.
Primesense, "The Primesense 3D Awareness Sensor", 2007.
Ramamoorthi, R., et al, "Frequency space environment map rendering" ACM Transactions on Graphics (SIGGRAPH 2002 proceedings) 21, 3, 517-526.
Ramamoorthi, R., et al., "An efficient representation for irradiance environment maps", in Proceedings of SIGGRAPH 2001, 497-500.
Raskar, Ramesh et al., "Glare Aware Photography: 4D Ray Sampling for Reducing Glare Effects of Camera Lenses," ACM Transactions on Graphics—Proceedings of ACM SIGGRAPH, Aug. 2008; vol. 27, Issue 3; pp. 1-10.
Raskar, Ramesh et al., "Non-photorealistic Camera: Depth Edge Detection and Stylized Rendering using Multi-Flash Imaging", SIGGRAPH 2004.
Raytrix, "Raytrix Lightfield Camera," Raytrix GmbH, Germany 2012, pp. 1-35.
Scharstein, Daniel, et al., "High-Accuracy Stereo Depth Maps Using Structured Light," CVPR'03 Proceedings of the 2003 IEEE Computer Society, pp. 195-202.
Schirmacher, H. et al., "High-Quality Interactive Lumigraph Rendering Through Warping," May 2000, Graphics Interface 2000.
Shade, Jonathan, et al., "Layered Depth Images", SIGGRAPH 98, pp. 1-2.
Shreiner, OpenGL Programming Guide, 7th edition, Chapter 8, 2010.
Simpleviewer, "Tiltview", http://simpleviewer.net/tiltviewer. Retrieved Jan. 2013.
Skodras, A. et al., "The JPEG 2000 Still Image Compression Standard," Sep. 2001, IEEE Signal Processing Magazine, pp. 36-58.
Sloan, P., et al., "Precomputed radiance transfer for real-time rendering in dynamic, low-frequency lighting environments", ACM Transactions on Graphics 21, 3, 527-536, 2002.
Snavely, Noah, et al., "Photo-tourism: Exploring Photo collections in 3D", ACM Transactions on Graphics (SIGGRAPH Proceedings), 2006.
Sokolov, "Autostereoscopy and Integral Photography by Professor Lippmann's Method" , 1911, pp. 23-29.
Sony Corp, "Interchangeable Lens Digital Camera Handbook", 2011.
Stensvold, M., "Hybrid AF: A New Approach to Autofocus is Emerging for both Still and Video", Digital Photo Magazine, Nov. 13, 2012.
Story, D., "The Future of Photography", Optics Electronics, Oct. 2008.
Sun, Jian, et al., "Stereo Matching Using Belief Propagation", 2002.
Tagging photos on Flickr, Facebook and other online photo sharing sites (see, for example, http://support.gnip.com/customer/portal/articles/809309-flickr-geo-photos-tag-search). Retrieved Jan. 2013.
Takahashi, Keita, et al., "All in-focus View Synthesis from Under-Sampled Light Fields", ICAT 2003, Tokyo, Japan.
Tanida et al., "Thin observation module by bound optics (TOMBO): concept and experimental verification" Applied Optics 40, 11 (Apr. 10, 2001), pp. 1806-1813.
Tao, Michael, et al., "Depth from Combining Defocus and Correspondence Using Light-Field Cameras", Dec. 2013.
Techcrunch, "Coolinis", Retrieved Jan. 2013.
Teo, P., et al., "Efficient linear rendering for interactive light design", Tech. Rep. STAN-CS-TN-97-60, 1998, Stanford University.

Teranishi, N. "Evolution of Optical Structure in Images Sensors," Electron Devices Meeting (IEDM) 2012 IEEE International; Dec. 10-13, 2012.
Vaish et al., "Using plane + parallax for calibrating dense camera arrays", In Proceedings CVPR 2004, pp. 2-9.
Vaish, V., et al., "Synthetic Aperture Focusing Using a Shear-Warp Factorization of the Viewing Transform," Workshop on Advanced 3D Imaging for Safety and Security (in conjunction with CVPR 2005), 2005.
VR Playhouse, "The Surrogate," http://www.vrplayhouse.com/the-surrogate.
Wanner, S. et al., "Globally Consistent Depth Labeling of 4D Light Fields," IEEE Conference on Computer Vision and Pattern Recognition, 2012.
Wanner, S. et al., "Variational Light Field Analysis for Disparity Estimation and Super-Resolution," IEEE Transacations on Pattern Analysis and Machine Intellegence, 2013.
Wenger, et al, "Performance Relighting and Reflectance Transformation with Time-Multiplexed Illumination", Institute for Creative Technologies, SIGGRAPH 2005.
Wetzstein, Gordon, et al., "Sensor Saturation in Fourier Multiplexed Imaging", IEEE Conference on Computer Vision and Pattern Recognition (2010).
Wikipedia—Adaptive Optics: http://en.wikipedia.org/wiki/adaptive_optics. Retrieved Feb. 2014.
Wikipedia—Autofocus systems and methods: http://en.wikipedia.org/wiki/Autofocus. Retrieved Jan. 2013.
Wikipedia—Bayer Filter: http:/en.wikipedia.org/wiki/Bayer_filter. Retrieved Jun. 20, 2013.
Wikipedia—Color Image Pipeline: http://en.wikipedia.org/wiki/color_image_pipeline. Retrieved Jan. 15, 2014.
Wikipedia—Compression standard JPEG XR: http://en.wikipedia.org/wiki/JPEG_XR. Retrieved Jan. 2013.
Wikipedia—CYGM Filter: http://en.wikipedia.org/wiki/CYGM_filter. Retrieved Jun. 20, 2013.
Wikipedia—Data overlay techniques for real-time visual feed. For example, heads-up displays: http://en.wikipedia.org/wiki/Head-up_display. Retrieved Jan. 2013.
Wikipedia—Exchangeable image file format: http://en.wikipedia.org/wiki/Exchangeable_image_file_format. Retrieved Jan. 2013.
Wikipedia—Expeed: http://en.wikipedia.org/wiki/EXPEED. Retrieved Jan. 15, 2014.
Wikipedia—Extensible Metadata Platform: http://en.wikipedia.org/wiki/Extensible_Metadata_Plafform. Retrieved Jan. 2013.
Wikipedia—Key framing for video animation: http://en.wikipedia.org/wiki/Key_frame. Retrieved Jan. 2013.
Wikipedia—Lazy loading of image data: http://en.wikipedia.org/wiki/Lazy_loading. Retrieved Jan. 2013.
Wikipedia—Methods of Variable Bitrate Encoding: http://en.wikipedia.org/wiki/Variable_bitrate#Methods_of VBR_encoding. Retrieved Jan. 2013.
Wikipedia—Portable Network Graphics format: http://en.wikipedia.org/wiki/Portable_Network_Graphics. Retrieved Jan. 2013.
Wikipedia—Unsharp Mask Technique: https://en.wikipedia.org/wiki/Unsharp_masking. Retrieved May 3, 2016.
Wilburn et al., "High Performance Imaging using Large Camera Arrays", ACM Transactions on Graphics (TOG), vol. 24, Issue 3 (Jul. 2005), Proceedings of ACM SIGGRAPH 2005, pp. 765-776.
Wilburn, Bennett, et al., "High Speed Video Using a Dense Camera Array", 2004.
Wilburn, Bennett, et al., "The Light Field Video Camera", Proceedings of Media Processors 2002.
Williams, L. "Pyramidal Parametrics," Computer Graphic (1983).
Winnemoller, H., et al., "Light Waving: Estimating Light Positions From Photographs Alone", Eurographics 2005.
Wippermann, F. "Chirped Refractive Microlens Array," Dissertation 2007.
Wuu, S., et al., "A Manufacturable Back-Side Illumination Technology Using Bulk Si Substrate for Advanced CMOS Image Sensors", 2009 International Image Sensor Workshop, Bergen, Norway.
Wuu, S., et al., "BSI Technology with Bulk Si Wafer", 2009 International Image Sensor Workshop, Bergen, Norway.

(56) References Cited

OTHER PUBLICATIONS

Xiao, Z. et al., "Aliasing Detection and Reduction in Plenoptic Imaging," IEEE Conference on Computer Vision and Pattern Recognition; 2014.

Xu, Xin et al., "Robust Automatic Focus Algorithm for Low Contrast Images Using a New Contrast Measure," Sensors 2011; 14 pages.

Zheng, C. et al., "Parallax Photography: Creating 3D Cinematic Effects from Stills", Proceedings of Graphic Interface, 2009.

Zitnick, L. et al., "High-Quality Video View Interpolation Using a Layered Representation," Aug. 2004; ACM Transactions on Graphics (TOG), Proceedings of ACM SIGGRAPH 2004; vol. 23, Issue 3; pp. 600-608.

Zoberbier, M., et al., "Wafer Cameras—Novel Fabrication and Packaging Technologies", 2009 International Image Senor Workshop, Bergen, Norway, 5 pages.

U.S. Appl. No. 15/967,076, filed Apr. 30, 2018 listing Jiantao Kuang et al. as inventors, entitled "Automatic Lens Flare Detection and Correction for Light-Field Images".

U.S. Appl. No. 15/666,298, filed Aug. 1, 2017 listing Yonggang Ha et al. as inventors, entitled "Focal Reducer With Controlled Optical Properties for Interchangeable Lens Light-Field Camera".

U.S. Appl. No. 15/590,808, filed May 9, 2017 listing Alex Song et al. as inventors, entitled "Adaptive Control for Immersive Experience Delivery".

U.S. Appl. No. 15/864,938, filed Jan. 8, 2018 listing Jon Karafin et al. as inventors, entitled "Motion Blur for Light-Field Images".

U.S. Appl. No. 15/703,553, filed Sep. 13, 2017 listing Jon Karafin et al. as inventors, entitled "4D Camera Tracking and Optical Stabilization".

U.S. Appl. No. 15/590,841, filed May 9, 2017 listing Kurt Akeley et al. as inventors, entitled "Vantage Generation and Interactive Playback".

U.S. Appl. No. 15/590,951, filed May 9, 2017 listing Alex Song et al. as inventors, entitled "Wedge-Based Light-Field Video Capture".

U.S. Appl. No. 15/944,551, filed Apr. 3, 2018 listing Zejing Wang et al. as inventors, entitled "Generating Dolly Zoom Effect Using Light Field Image Data".

U.S. Appl. No. 15/874,723, filed Jan. 18, 2018 listing Mark Weir et al. as inventors, entitled "Multi-Camera Navigation Interface".

U.S. Appl. No. 15/897,994, filed Feb. 15, 2018 listing Trevor Carothers et al. as inventors, entitled "Generation of Virtual Reality With 6 Degrees of Freesom From Limited Viewer Data".

U.S. Appl. No. 15/605,037, filed May 25, 2017 listing Zeijing WAng et al. as inventors, entitled "Multi-View Back-Projection to a Light-Field".

U.S. Appl. No. 15/897,836, filed Feb. 15, 2018 listing Francois Bleibel et al. as inventors, entitled "Multi-View Contour Tracking".

U.S. Appl. No. 15/897,942, filed Feb. 15, 2018 listing Francois Bleibel et al. as inventors, entitled "Multi-View Contour Tracking With Grabcut".

Adelsberger, R. et al., "Spatially Adaptive Photographic Flash," ETH Zurich, Department of Computer Science, Technical Report 612, 2008, pp. 1-12.

Adelson et al., "Single Lens Stereo with a Plenoptic Camera" IEEE Translation on Pattern Analysis and Machine Intelligence, Feb. 1992. vol. 14, No. 2, pp. 99-106.

Adelson, E. H., and Bergen, J. R. 1991. The plenoptic function and the elements of early vision. In Computational Models of Visual Processing, edited by Michael S. Landy and J. Anthony Movshon. Cambridge, Mass.: mit Press.

Adobe Systems Inc, "XMP Specification", Sep. 2005.

Adobe, "Photoshop CS6 / in depth: Digital Negative (DNG)", http://www.adobe.com/products/photoshop/extend.displayTab2html. Retrieved Jan. 2013.

Agarwala, A., et al., "Interactive Digital Photomontage," ACM Transactions on Graphics, Proceedings of SIGGRAPH 2004, vol. 32, No. 3, 2004.

Andreas Observatory, Spectrograph Manual: IV. Flat-Field Correction, Jul. 2006.

Apple, "Apple iPad: Photo Features on the iPad", Retrieved Jan. 2013.

Bae, S., et al., "Defocus Magnification", Computer Graphics Forum, vol. 26, Issue 3 (Proc. of Eurographics 2007), pp. 1-9.

Belhumeur, Peter et al., "The Bas-Relief Ambiguity", International Journal of Computer Vision, 1997, pp. 1060-1066.

Belhumeur, Peter, et al., "The Bas-Relief Ambiguity", International Journal of Computer Vision, 1999, pp. 33-44, revised version.

Bhat, P. et al. "GradientShop: A Gradient-Domain Optimization Framework for Image and Video Filtering," SIGGRAPH 2010; 14 pages.

Bolles, R., et al., "Epipolar-Plane Image Analysis: An Approach to Determining Structure from Motion", International Journal of Computer Vision, 1, 7-55 (1987).

Bourke, Paul, "Image filtering in the Frequency Domain," pp. 1-9, Jun. 1998.

Canon, Canon Speedlite wireless flash system, User manual for Model 550EX, Sep. 1998.

Chai, Jin-Xang et al., "Plenoptic Sampling", ACM SIGGRAPH 2000, Annual Conference Series, 2000, pp. 307-318.

Chen, S. et al., "A CMOS Image Sensor with On-Chip Image Compression Based on Predictive Boundary Adaptation and Memoryless QTD Algorithm," Very Large Scalee Integration (VLSI) Systems, IEEE Transactions, vol. 19, Issue 4; Apr. 2011.

Chen, W., et al., "Light Field mapping: Efficient representation and hardware rendering of surface light fields", ACM Transactions on Graphics 21, 3, 447-456, 2002.

Cohen, Noy et al., "Enhancing the performance of the light field microscope using wavefront coding," Optics Express, vol. 22, issue 20; 2014.

Daly, D., "Microlens Arrays" Retrieved Jan. 2013.

Debevec, et al, "A Lighting Reproduction Approach to Live-Action Compoisting" Proceedings SIGGRAPH 2002.

Debevec, P., et al., "Acquiring the reflectance field of a human face", SIGGRAPH 2000.

Debevec, P., et al., "Recovering high dynamic radiance maps from photographs", SIGGRAPH 1997, 369-378.

Design of the xBox menu. Retrieved Jan. 2013.

Digital Photography Review, "Sony Announce new RGBE CCD," Jul. 2003.

Dorsey, J., et al., "Design and simulation of opera light and projection effects", in Computer Graphics (Proceedings of SIGGRAPH 91), vol. 25, 41-50.

Dorsey, J., et al., "Interactive design of complex time dependent lighting", IEEE Computer Graphics and Applications 15, 2 (Mar. 1995), 26-36.

Dowski et al., "Wavefront coding: a modern method of achieving high performance and/or low cost imaging systems" SPIE Proceedings, vol. 3779, Jul. 1999, pp. 137-145.

Dowski, Jr. "Extended Depth of Field Through Wave-Front Coding," Applied Optics, vol. 34, No. 11, Apr. 10, 1995; pp. 1859-1866.

Duparre, J. et al., "Micro-Optical Artificial Compound Eyes," Institute of Physics Publishing, Apr. 2006.

Eisemann, Elmar, et al., "Flash Photography Enhancement via Intrinsic Relighting", SIGGRAPH 2004.

Fattal, Raanan, et al., "Multiscale Shape and Detail Enhancement from Multi-light Image Collections", SIGGRAPH 2007.

Fernando, Randima, "Depth of Field—A Survey of Techniques," GPU Gems. Boston, MA; Addison-Wesley, 2004.

Fitzpatrick, Brad, "Camlistore", Feb. 1, 2011.

Fujifilm, Super CCD EXR Sensor by Fujifilm, brochure reference No. EB-807E, 2008.

Georgiev, T. et al., "Reducing Plenoptic Camera Artifacts," Computer Graphics Forum, vol. 29, No. 6, pp. 1955-1968; 2010.

Georgiev, T., et al., "Spatio-Angular Resolution Tradeoff in Integral Photography," Proceedings of Eurographics Symposium on Rendering, 2006.

Georgiev, T., et al., "Suppersolution with Plenoptic 2.0 Cameras," Optical Society of America 2009; pp. 1-3.

Georgiev, T., et al., "Unified Frequency Domain Analysis of Lightfield Cameras" (2008).

Georgiev, T., et al., Plenoptic Camera 2.0 (2008).

(56) References Cited

OTHER PUBLICATIONS

Girod, B., "Mobile Visual Search", IEEE Signal Processing Magazine, Jul. 2011.
Gortler et al., "The lumigraph" SIGGRAPH 96, pp. 43-54.
Groen et al., "A Comparison of Different Focus Functions for Use in Autofocus Algorithms," Cytometry 6:81-91, 1985.
Haeberli, Paul "A Multifocus Method for Controlling Depth of Field" GRAPHICA Obscura, 1994, pp. 1-3.
Heide, F. et al., "High-Quality Computational Imaging Through Simple Lenses," ACM Transactions on Graphics, SIGGRAPH 2013; pp. 1-7.
Heidelberg Collaboratory for Image Processing, "Consistent Depth Estimation in a 4D Light Field," May 2013.
Hirigoyen, F., et al., "1.1 um Backside Imager vs. Frontside Image: an optics-dedicated FDTD approach", IEEE 2009 International Image Sensor Workshop.
Huang, Fu-Chung et al., "Eyeglasses-free Display: Towards Correcting Visual Aberrations with Computational Light Field Displays," ACM Transaction on Graphics, Aug. 2014, pp. 1-12.
Isaksen, A., et al., "Dynamically Reparameterized Light Fields," SIGGRAPH 2000, pp. 297-306.
Ives H., "Optical properties of a Lippman lenticulated sheet," J. Opt. Soc. Am. 21, 171 (1931).
Ives, H. "Parallax Panoramagrams Made with a Large Diameter Lens", Journal of the Optical Society of America; 1930.
Jackson et al., "Selection of a Convolution Function for Fourier Inversion Using Gridding" IEEE Transactions on Medical Imaging, Sep. 1991, vol. 10, No. 3, pp. 473-478.
Kautz, J., et al., "Fast arbitrary BRDF shading for low-frequency lighting using spherical harmonics", in Eurographic Rendering Workshop 2002, 291-296.
Koltun, et al., "Virtual Occluders: An Efficient Interediate PVS Representation", Rendering Techniques 2000: Proc. 11th Eurographics Workshop Rendering, pp. 59-70, Jun. 2000.
Kopf, J., et al., Deep Photo: Model-Based Photograph Enhancement and Viewing, SIGGRAPH Asia 2008.
Lehtinen, J., et al. "Matrix radiance transfer", in Symposium on Interactive 3D Graphics, 59-64, 2003.
Lesser, Michael, "Back-Side Illumination", 2009.
Levin, A., et al., "Image and Depth from a Conventional Camera with a Coded Aperture", SIGGRAPH 2007, pp. 1-9.
Levoy et al.,"Light Field Rendering" SIGGRAPH 96 Proceeding, 1996. pp. 31-42.
Levoy, "Light Fields and Computational Imaging" IEEE Computer Society, Aug. 2006, pp. 46-55.
Levoy, M. "Light Field Photography and Videography," Oct. 18, 2005.
Levoy, M. "Stanford Light Field Microscope Project," 2008; http://graphics.stanford.edu/projects/lfmicroscope/, 4 pages.
Levoy, M., "Autofocus: Contrast Detection", http://graphics.stanford.edu/courses/cs178/applets/autofocusPD.html, pp. 1-3, 2010.
Levoy, M., "Autofocus: Phase Detection", http://graphics.stanford.edu/courses/cs178/applets/autofocusPD.html, pp. 1-3, 2010.
Levoy, M., et al., "Light Field Microscopy," ACM Transactions on Graphics, vol. 25, No. 3, Proceedings SIGGRAPH 2006.

Liang, Chia-Kai, et al., "Programmable Aperture Photography: Multiplexed Light Field Acquisition", ACM SIGGRAPH, 2008.
Lippmann, "Reversible Prints", Communication at the French Society of Physics, Journal of Physics, 7 , 4, Mar. 1908, pp. 821-825.
Lumsdaine et al., "Full Resolution Lightfield Rendering" Adobe Technical Report Jan. 2008, pp. 1-12.
Maeda, Y. et al., "A CMOS Image Sensor with Pseudorandom Pixel Placement for Clear Imaging," 2009 International Symposium on Intelligent Signal Processing and Communication Systems, Dec. 2009.
Magnor, M. et al., "Model-Aided Coding of Multi-Viewpoint Image Data," Proceedings IEEE Conference on Image Processing, ICIP—2000, Vancouver, Canada, Sep. 2000. https://graphics.tu-bs.de/static/people/magnor/ publications/icip00.pdf.
Mallat, Stephane, "A Wavelet Tour of Signal Processing", Academic Press 1998.
Malzbender, et al., "Polynomial Texture Maps", Proceedings SIGGRAPH 2001.
Marshall, Richard J. et al., "Improving Depth Estimation from a Plenoptic Camera by Patterned Illumination," Proc. of SPIE, vol. 9528, 2015, pp. 1-6.
Masselus, Vincent, et al., "Relighting with 4D Incident Light Fields", SIGGRAPH 2003.
Meynants, G., et al., "Pixel Binning in CMOS Image Sensors," Frontiers in Electronic Imaging Conference, 2009.
Moreno-Noguer, F. et al., "Active Refocusing of Images and Videos," ACM Transactions on Graphics, Aug. 2007; pp. 1-9.
Munkberg, J. et al., "Layered Reconstruction for Defocus and Motion Blur" EGSR 2014, pp. 1-12.
Naemura et al., "3-D Computer Graphics based on Integral Photography" Optics Express, Feb. 12, 2001. vol. 8, No. 2, pp. 255-262.
Nakamura, J., "Image Sensors and Signal Processing for Digital Still Cameras" (Optical Science and Engineering), 2005.
National Instruments, "Anatomy of a Camera," pp. 1-5, Sep. 6, 2006.
Nayar, Shree, et al., "Shape from Focus", IEEE Transactions on Pattern Analysis and Machine Intelligence, vol. 16, No. 8, pp. 824-831, Aug. 1994.
Ng, R., et al. "Light Field Photography with a Hand-held Plenoptic Camera," Stanford Technical Report, CSTR 2005-2, 2005.
Ng, R., et al., "All-Frequency Shadows Using Non-linear Wavelet Lighting Approximation. ACM Transactions on Graphics," ACM Transactions on Graphics; Proceedings of SIGGRAPH 2003.
Ng, R., et al., "Triple Product Wavelet Integrals for All-Frequency Relighting", ACM Transactions on Graphics (Proceedings of SIGGRAPH 2004).
Ng, Yi-Ren, "Digital Light Field Photography," Doctoral Thesis, Standford University, Jun. 2006; 203 pages.
Ng., R., "Fourier Slice Photography," ACM Transactions on Graphics, Proceedings of SIGGRAPH 2005, vol. 24, No. 3, 2005, pp. 735-744.
Nguyen, Hubert. "Practical Post-Process Depth of Field." GPU Gems 3. Upper Saddle River, NJ: Addison-Wesley, 2008.
Roper Scientific Germany, "Fiber Optics", 2012.
Sony's First Curved Sensor Photo: http://www.engadget.com. Jul. 2014.

* cited by examiner

IMAGE CAPTURE FOR VIRTUAL REALITY DISPLAYS

CROSS-REFERENCE TO RELATED APPLICATIONS

The present application claims the benefit of U.S. Provisional Application Ser. No. 62/333,637 for "Image Capture for Virtual Reality Displays", filed May 9, 2016, the disclosure of which is incorporated herein by reference in its entirety.

The present application also claims priority as a continuation-in-part of U.S. patent application Ser. No. 15/084,326 for "Capturing Light-Field Volume Images and Video Data Using Tiled Light-Field Cameras", filed Mar. 29, 2016, the disclosure of which is incorporate herein by reference in its entirety.

U.S. patent application Ser. No. 15/084,326 claims the benefit of U.S. Provisional Application Ser. No. 62/148,055 for "Light Guided Image Plane Tiled Arrays with Dense Fiber Optic Bundles for Light-Field and High Resolution Image Acquisition", filed Apr. 15, 2015, the disclosure of which is incorporated herein by reference in its entirety.

U.S. patent application Ser. No. 15/084,326 also claims the benefit of U.S. Provisional Application Ser. No. 62/148,460 for "Capturing Light-Field Volume Image and Video Data Using Tiled Light-Field Cameras", filed Apr. 16, 2015, the disclosure of which is incorporated herein by reference in its entirety The present application is also related to U.S. patent application Ser. No. 14/302,826 for "Depth Determination for Light-Field Images", filed Jun. 12, 2014 and issued as U.S. Pat. No. 8,988,317 on Mar. 24, 2015, the disclosure of which is incorporated herein by reference.

TECHNICAL FIELD

The present document relates to various techniques for improving image capture for virtual reality displays.

BACKGROUND

Some current volumetric capture systems (or virtual reality (VR) capture systems), such as Lytro Immerge, sparsely sample a light-field volume using a relatively large number of cameras. The cameras can be arranged, for example, over a lattice that covers a flat surface, or a 3D surface such as a sphere. The cameras may thus define a "tiled camera array." The cameras may be traditional 2D cameras, array cameras, or plenoptic light-field cameras, as described in above-referenced U.S. Provisional Application 62/148,460. Whichever system is used, it is often difficult to avoid some sparseness of the samples, leaving gaps in the coverage. Thus, in order to provide virtual reality functionality, the rendering system may advantageously interpolate between camera views.

When a viewer is watching and interacting with the captured virtual reality environment (or "volume"), it is beneficial for the playback system to allow the viewer to have as many degrees of freedom as feasible to explore the captured volume. For, example, six degrees of freedom may be provided, so as to allow the user full angular viewing freedom (yaw, pitch, roll) as well as spatial viewing freedom (translation side-to-side, up and down, and forward and backward). In general, it is desirable to provide for movement along the degrees of freedom seamlessly and smoothly.

In general, the ability of a VR capture system to deliver high quality playback at interpolated viewpoints is limited by the density of the capture viewpoints and the ability of the system to interpolate between capture viewpoints, which may in turn depend on the quality of the system's estimation of various properties of objects in the world. In order to provide accurate interpolations, it is useful to have information about properties of surfaces and objects. Estimated world properties may include, for example and without limitation, 3D geometry, reflectance, specularity of materials, transparency/translucency of objects, and/or the like. In many situations, however, it may be difficult or impossible to estimate these world properties with a sufficient degree of accuracy or precision to provide the desired results. Fine objects like hair may also be problematic.

Various techniques can be used to improve the quality of the systems with respect to artifacts caused by errors in such estimated properties. One option may be to increase the density of cameras in the capture system, and thus reduce the amount of interpolation that is required. However, increasing density can increase system requirements, costs, storage, processing, heat management, and/or the like. Furthermore, there is a physical limit to how closely cameras may be spaced in the tiled camera array.

Other techniques for improving quality include improving the accuracy of the world estimation process. While such an approach may be appealing, it can be difficult or impossible within the constraints of the system. Another option may be to include additional types of sensors designed for specific purposes. Examples include LiDAR sensors, Time-of-Flight (ToF) sensors, and structured light. Specialized sensors may help improve the accuracy of certain aspects of the world estimation process, but may still not improve the level of accuracy to the desired level.

SUMMARY

Multiple techniques are described herein to improve the overall perceptual quality of the volumetric video playback experience. The systems and methods presented herein may be applied separately or in any suitable combination with one another.

In general, the systems and methods presented herein may provide mechanisms for minimizing errors in interpolation and world property estimation, so as to provide an improved virtual environment experience.

In at least one embodiment, a mix of camera types is used in the capture system, with varying resolution, density, and/or field-of-view. This capture system employing a mix of camera types may be considered a tiered camera array. In some cases the cameras of the tiered camera array may include multiple sets of cameras, for example, with a first plurality of cameras (a "first tier") with a relatively lower density of cameras with relatively higher resolution, and a second plurality of cameras (a "second tier") with a relatively higher density of cameras with a relatively lower resolution. If desired, more than two tiers may be used. The tiers may be arranged in interleaved patterns in which voids in denser tiers are filled with cameras from less dense tiers.

In at least one embodiment, when world properties are estimated, the estimated properties also include an error metric and/or confidence value of the estimated property. For example, such an error metric may be a measure of the photometric consistency of an estimated 3D patch in the world. If all the cameras that can see a particular portion of a scene provide subviews with consistent image data and/or world properties, there may be high confidence in the accuracy of the estimate of world properties for that portion of the scene. If the image data and/or world properties differ widely between the subviews, as may be the case for many visually complex objects and for estimation errors, then the confidence value may be low. A confidence map may be generated for each subview, representing the confidence level in each of multiple regions of the subview.

When a virtual view is to be rendered, the confidence map, the world properties, and/or the subview may be used. Each region of the subview and world properties for a subview may be used in rendering the virtual view to the extent of the confidence level for that region. In some embodiments, some of the cameras may be designated as primary cameras for which the subview and/or world properties are preferentially used. For regions in which the estimated world properties for a primary camera have low confidence, the subview and/or world properties for a secondary camera may be used instead. For a tiered camera array as described previously, the higher resolution cameras may be primary cameras, while lower resolution may be secondary tertiary, etc. Thus, the virtual view may be rendered with a balance between high resolution and high confidence in the associated world properties.

BRIEF DESCRIPTION OF THE DRAWINGS

The accompanying drawings illustrate several embodiments. Together with the description, they serve to explain the principles of the embodiments. One skilled in the art will recognize that the particular embodiments illustrated in the drawings are merely exemplary, and are not intended to limit scope.

DETAILED DESCRIPTION

Figure 1:
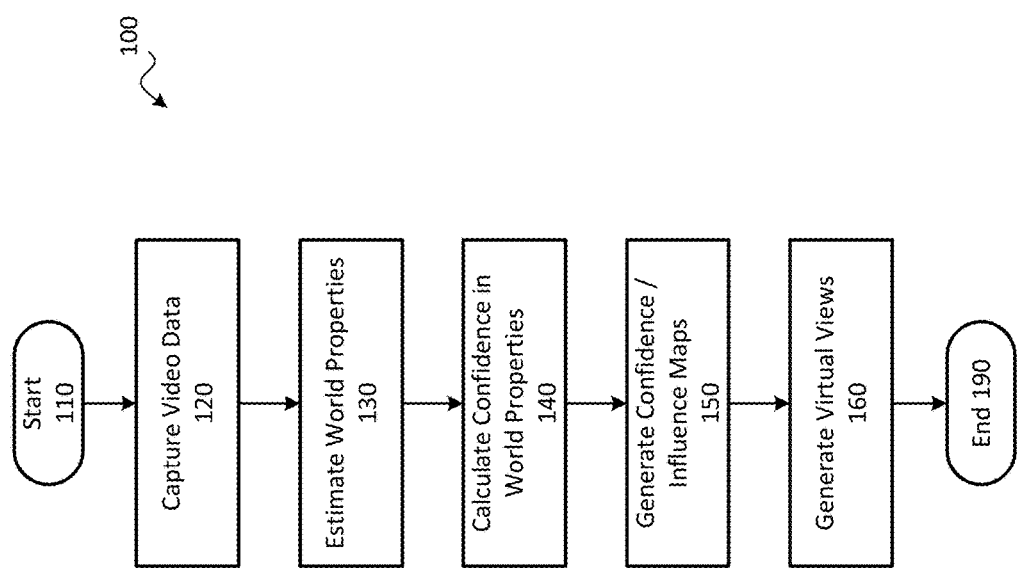
FIG. 1 is a flow diagram depicting a method, from image and/or video capture to virtual view reconstruction, according to one embodiment.

Multiple methods for capturing image and/or video data in a light-field volume and creating virtual views from such data are described. The described embodiments may provide for capturing continuous or nearly continuous light-field data from many or all directions facing away from the capture system, which may enable the generation of virtual views that are more accurate and/or allow viewers greater viewing freedom. In some embodiments, the viewer may move with six degrees of freedom while viewing the environment captured in the video data with virtual views rendered in real-time based on the position and orientation of the viewer's head.

Definitions

For purposes of the description provided herein, the following definitions are used:

| | |
|---|---|
| Degrees of freedom | The dimensions in which a user or viewer may explore during playback. Six degrees of freedom (or 6DOF) allow the user full angular viewing freedom (yaw, pitch, roll) as well as spatial viewing freedom (translation side-to-side, up and down, and forward and backward) |
| Vantage | Precomputed virtual view that may or may not be co-located with a physical camera. |
| Photometric consistency | Measure of agreement between cameras, for example, calculated by adjusting and comparing pixel windows from different cameras. Adjustments may be made taking into account the estimated world properties, such as the 3D location of a patch of the captured environment that appears in the subview under consideration. The photometric consistency may be based on agreement or consistency between versions of the patch, as viewed from different subviews. Various metrics may be used, including calculation of the average pixel error. |

| | |
|---|---|
| View-dependent lighting | Apparent changes in appearance of a point on an object that are dependent on the position of the observer. For example, surface reflections and refractive objects may appear very different when viewed from slightly different positions, based on the viewpoint position relative to light reflecting from or passing through the object. |
| Light-field image | The four dimensional sample representing the information carried by the ray bundles of light depicting an environment. Each ray may be indexed by a standard four-dimensional coordinate system. |
| Light-field volume | In this document, a light-field volume is the combination of all images captured into a single data set. A light-field volume may be fully or sparsely sampled. |
| Fully-sampled light-field volume | A fully sampled light-field volume includes ray data from all directions at any location within the volume. Within a fully-sampled light-field volume, virtual views may be generated from any point, facing any direction, with any field-of-view. Further, the virtual views may be generated without the need for estimated world properties (for example, 3D scene information). In general, camera arrays do not capture a fully sampled light-field volume. |
| Sparsely sampled light-field volume | A light-field volume that is not fully sampled. In general, capture systems may record image and/or video data from a number of discrete viewpoints. The data captured at these discrete viewpoints may be considered the sparse samples. Data may not be recorded between the discrete viewpoints. Virtual views may be generated from a sparsely sampled light-field volume, but may require the use of estimated world properties (for example, 3D scene information) to produce acceptable results. |
| Capture system | In this document, the term "capture system" refers to any system usable for capturing a volume for use in a virtual reality system. One example of a capture system is an array of cameras used to capture a light-field volume. A camera system is one type of capture system. A light-field camera is one type of camera system, and may be a light-field camera such as a plenoptic light-field camera or a tiled camera array (a "tiled camera array"). A tiered camera array is one type of tiled camera array. |
| Capture surface | The physical surface of the capture system that actively captures photons. The capture surface may be considered to be approximately the surface defined by the combined outward-facing surfaces of all objective lenses of the camera system. |
| Camera density | Measure of number of cameras per unit of area on the capture surface. |
| Light-field camera | A device that can capture a light-field image. |
| Capture system calibration data | Calibration data for a multiview and/or multi-camera capture system. The calibration data may include, but is not limited to, camera intrinsic calibration (focal length, undistortion parameters, pixel size, etc.), camera extrinsic calibration (camera position and orientation relative to a reference coordinate system), and traditional camera calibration data (for example, black frame data, color conversion matrices, lens vignetting correction values, etc.). |
| Plenoptic light-field camera | A specific implementation of a light-field camera. This is a microlens-based approach where a plenoptic microlens array is inserted in-between the objective lens and the photosensor. |
| Plenoptic microlens array | A microlens array in a plenoptic camera that is used to capture the directional information. Each microlens in the array may create an image of the aperture stop of the objective lens on the surface of the sensor. |
| Disk image | A single image of the aperture stop, viewed through a plenoptic microlens, and captured by a region on the sensor surface. |
| Tiled camera array | A specific implementation of a light-field camera. This implementation contains an array of objective lenses with overlapping fields-of-view and one or more photosensors. Each viewpoint, with one corresponding to each lens in the objective lens array, in a tiled camera array is captured as a separate image. A tiled camera array is one type of multiview capture system. |
| Tiered camera array (or "tiered array light-field camera") | A tiled camera array including two or more types of cameras, in which each type (or tier) may capture images and/or video of a different resolution. |
| Ray, or Ray bundle | A "Ray bundle" refers to set of light rays recorded in aggregate by a single pixel in a photosensor. The terms "ray" and "ray bundle" may be used interchangeably. |
| Patch | A small, oriented surface in 3D space within an environment captured in light-field data such as light-field video data, used for multiview photoconsistency calculations. These patches are often (but need not be) rectangular, and in some cases may correspond in size to approximately 3 × 3 or 5 × 5 pixel regions within a subview. |
| Reference camera | During some computations using multiview datasets, it may be pragmatic to perform calculations and/or comparisons in a reference frame that is consistent with the subview from a single camera. This camera may be considered the reference camera during the computation. |
| Entrance pupil | In an optical system, the entrance pupil is the optical image of the physical aperture stop, as seen through the front of the lens system. The geometric size, location, and angular acceptance of the entrance pupil may determine the camera's window of view into the world. |
| Subview | A subview is the view or image from an individual view in a light-field camera. In a plenoptic light-field camera, this is a subaperture image. In a tiled camera array, this is the image created by a single objective lens in the objective lens array. In a tiled camera array with multiple cameras with independent photosensors, a subview is the image captured the sensor of an individual photosensor. |
| Virtual view | A reconstructed view, typically for display in a virtual reality (VR) or augmented reality (AR) headset. The virtual view may be generated by resampling and/or interpolating from the light-field volume. |
| Virtual reality (VR) | An immersive viewing experience, typically delivered by a VR headset or other device. |
| Augmented reality (AR) | An immersive viewing experience that includes a combination of virtual reality elements with real-world surroundings and objects, typically delivered by an AR headset or other device. |
| Stereo virtual reality | An extended form of virtual reality in which each eye is shown a different view of the virtual world, enabling stereoscopic 3D perception. |
| Confidence | A numerical value, often in [0, 1], that may be assigned to estimated world properties. A value at or near 0 may indicate little or no confidence in the accuracy of the estimate, while a value at or near 1 indicates a high degree of confidence. |
| Influence | A numerical value, often in [0, 1], that may be assigned to pixel data and/or ray samples. The value may be used to weight the relative contributions of the pixel data and/or ray samples during image reconstruction at a virtual viewpoint. A value at or near 0 may indicate that the contribution should be very low, while a value at or near 1 may indicate that the contribution should be high. Notably, influence and confidence are often tightly coupled, where the influence may be calculated as a function of the confidence and potentially other factors. |

| | |
|---|---|
| Hallucination Algorithm | An algorithm that fills in voids or low-resolution areas in an image, or in light-field data, with color and/or other data based on those present in surrounding areas. |

In addition, for ease of nomenclature, the term "camera" is used herein to refer to an image capture device or other data acquisition device. Such a data acquisition device can be any device or system for acquiring, recording, measuring, estimating, determining and/or computing data representative of a scene, including but not limited to two-dimensional image data, three-dimensional image data, and/or light-field data. Such a data acquisition device may include optics, sensors, and image processing electronics for acquiring data representative of a scene, using techniques that are well known in the art. One skilled in the art will recognize that many types of data acquisition devices can be used in connection with the present disclosure, and that the disclosure is not limited to cameras. Thus, the use of the term "camera" herein is intended to be illustrative and exemplary, but should not be considered to limit the scope of the disclosure. Specifically, any use of such term herein should be considered to refer to any suitable device for acquiring image data.

In the following description, several techniques and methods for processing light-field images and/or video are described. One skilled in the art will recognize that these various techniques and methods can be performed on images and on video (generalized herein as "video data," or in the light-field context, "light-field video data"). Further, the techniques and methods presented herein may be used in connection with a wide variety of camera types. Even though several examples utilize a tiered camera array, one of skill in the art will recognize how the described methods and techniques could be applied to a tiled camera array that is not a tiered camera array, or to a plenoptic light-field camera.

Problem Description

In order to create the highest image quality possible, particularly for VR or AR experiences with six degrees of freedom, it may be desirable to capture a fully sampled light-field volume. With a fully sampled light-field volume dataset, virtual views may be computed directly from the ray samples, and may not require additional information (for example, estimated world properties like 3D scene information). However, capturing a fully sampled light-field volume of sufficient size and resolution to generate a desirable virtual reality experience may be highly impractical or even impossible.

Figure 5:
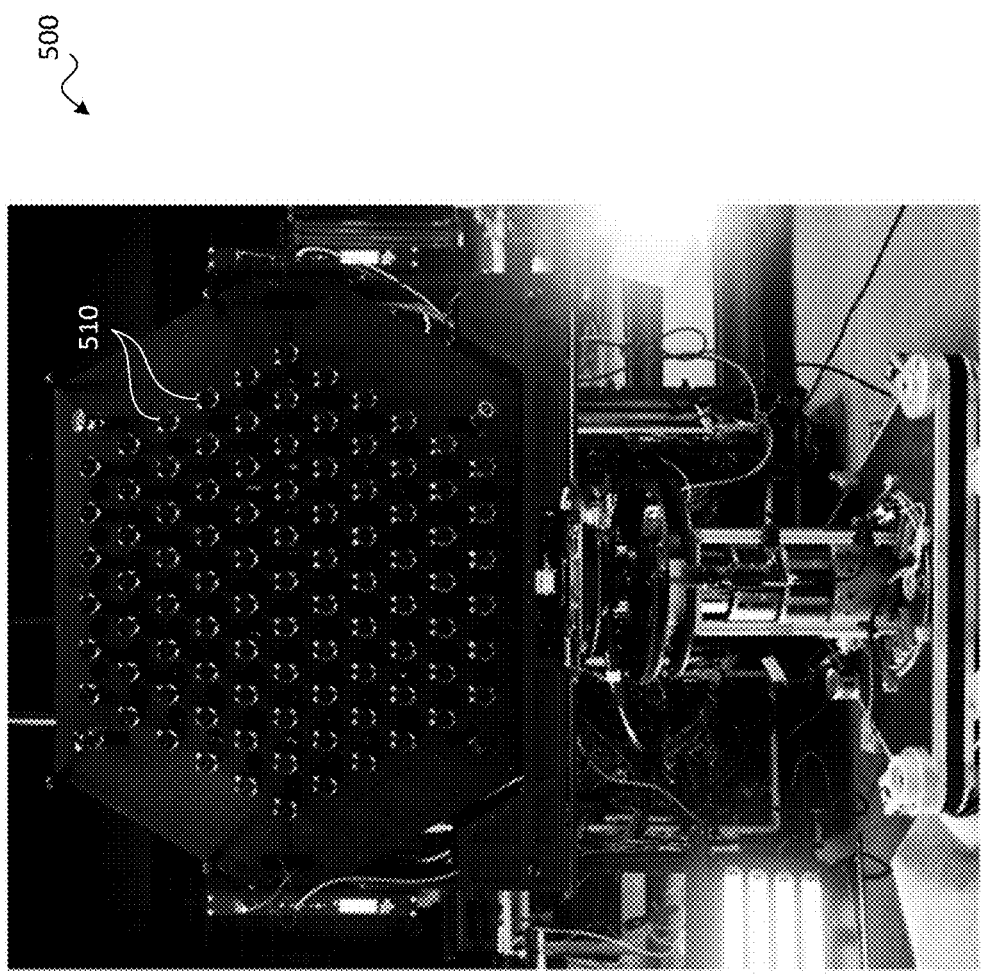
FIG. 5 is an example of an existing tiled camera array, known as the Lytro Immerge, according to one embodiment.

Due to practical considerations, existing solutions for capturing light-field volume video data are limited to capturing sparsely sampled light-field volumes. In general, existing systems employ a plurality of discrete cameras, each of which captures a subview. For example, FIG. 5 is an example of an existing tiled camera array 500, known as the Lytro Immerge, according to one embodiment. The Lytro Immerge has a large number of identical cameras 510 laid out approximately in a planar hexagonal lattice.

In order to use a sparsely sampled light-field volume to reconstruct arbitrary virtual views (for example, virtual views at locations and/or locations within the light-field volume that are determined by the location and/or orientation of the viewer's head), estimated world properties may be required. World properties may include aspects of the 3D environment captured in the light-field video, which may include but are not limited to the geometry and/or properties (such as reflectance, specularity, and/or translucency of the objects) of objects appearing in the video data.

Further, the required accuracy and/or complexity of the estimated world properties may be inversely related to the density of the cameras in the capture system. For example, reconstructing a virtual view based on a center of perspective that is one centimeter from a subview may be significantly easier and have significantly lower error than reconstructing the same virtual view from a subview that is ten centimeters away. In many cases, the projection error (measured in pixel displacement) may increase approximately linearly with the distance between the center of perspective of the virtual view and the center of perspective of the subview, given the same error in the estimated world properties.

As a result, it may be desirable to space cameras as closely as possible in the capture system, and thus reduce the amount of interpolation that is required. However, increasing density can increase system requirements, costs, storage, processing, heat management, and/or the like. Furthermore, there is a physical limit to how closely cameras may be spaced.

Overview

FIG. 1 is a flow diagram depicting a method 100 from image and/or video capture to virtual view reconstruction, according to one embodiment. The method 100 may start 110 with a step 120 in which video data is captured with a light-field camera system. In some embodiments, the video data may be captured with a tiered camera array with two or more different tiers of cameras that differ in resolution and/or density of arrangement, as will be shown and described subsequently. In alternative embodiments, a different light-field camera, such as a tiled camera array with only one camera type (i.e., a non-tiered camera array) or a plenoptic camera system may be used.

In a step 130, world properties may be estimated. The world properties may be estimated via analysis of the light-field video and/or other information, such as camera parameters and/or information about the scene from other sources. In some examples, other sensors such as LiDAR sensors may be used to provide geometry information regarding the environment captured in the video data. Such additional information may facilitate estimation of the world properties. In the alternative to or in addition to the foregoing, any techniques known in the art for estimating world properties for an environment captured in light-field or conventional video data may be used.

In a step 140, a confidence level in the estimated world properties ascertained in the step 130 may be calculated. The confidence level may represent the level of confidence that the estimated world properties are accurate. The confidence level may be expressed in many ways; according to one example, the confidence level may be numeric and may range from 0 to 1, with 0 representing low or no confidence, and 1 representing complete confidence.

In a step 150, a confidence map and/or an influence map may be generated for each of one or more of the subviews. A confidence map may be based on the world properties, as viewed from the subview, and may indicate a confidence level in the estimated world properties for objects visible in each region of the subview. A "region" may represent a ray bundle received in the photosensor of the camera system, and may have any size; in some embodiments, a region may be a single pixel; in other embodiments, each region may be 3×3 pixels square, 5×5 pixels square, or the like. In some embodiments, the confidence map may be a grayscale image, with light areas representing high confidence regions and darker areas representing low confidence regions.

In addition to or in the alternative to generation of a confidence map, an influence map may be generated in the step 150. The influence map may, for example, be a grayscale image indicative how much influence each region should have over the virtual view to be rendered. For example, lighter shades may be used for regions that are to have a high level of influence on the virtual view, while darker shades may be used for less influential regions. Like the confidence map, the influence map may be based, at least in part, on the confidence levels ascertained in the step 140.

In a step 160, one or more virtual views may be generated through the use of the subviews, the estimated world properties, and/or the confidence levels associated with each ray bundle. The estimated world properties may be used to enhance the quality of extrapolation between subviews as described above. The confidence levels may be used to further enhance the quality of virtual views generated by effectively determining which subview(s) should be used to render each region of the virtual view.

For regions of different subviews that have the same or similar confidence levels, the region with the higher resolution may preferentially be used to render the corresponding region of the virtual view. Regions with high confidence levels may be prioritized over regions with lower confidence levels for rendering the corresponding region of the virtual view.

In one embodiment, where the video data is captured with a tiered camera array, during creation of virtual views (for example, using an approach like depth image based rendering), ray data from the highest resolution cameras may preferentially be used, as long as the associated confidence and/or influence values are sufficiently high. In regions of the virtual view where insufficient information from the high resolution cameras may be available (for example, due to low confidence in the estimated world properties and/or occlusions in the originally captured data), ray bundle data from the lower resolution camera(s) may be used.

Once all desired virtual views have been rendered, the method 100 may end 190. This may represent the end of the VR or AR experience.

Figure 2:
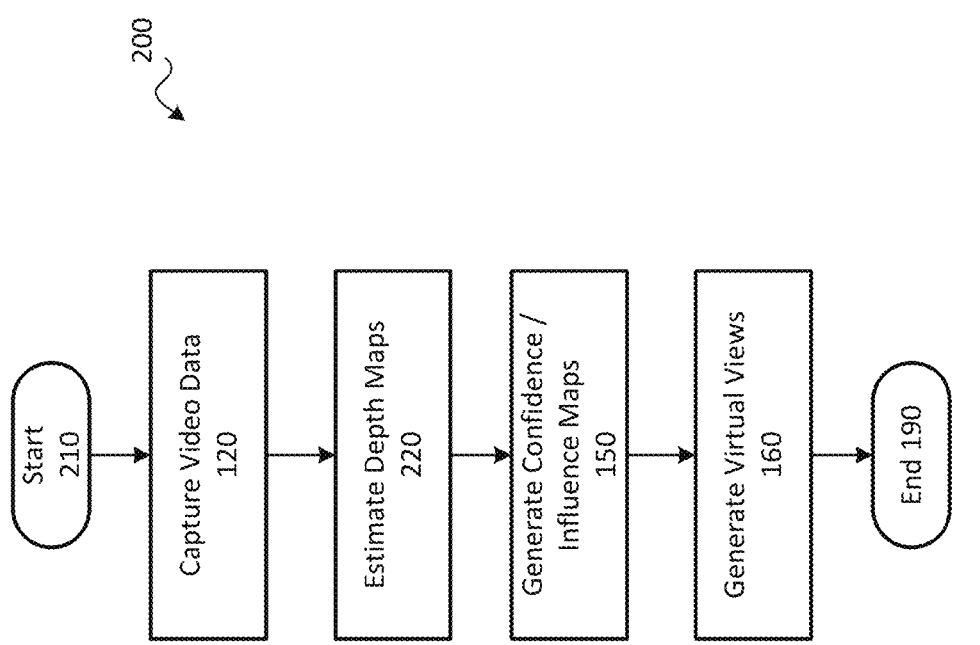
FIG. 2 is a block diagram processing flow, from image and/or video capture to virtual view reconstruction, according to another embodiment.

FIG. 2 is a block diagram processing flow, depicting a method 200 from image and/or video capture to virtual view reconstruction, according to another embodiment. The method 200 may start 210 with the step 120 in which video data is captured as in the method 100. Then, in a step 220, depth maps may be generated.

A depth map may be a grayscale image depicting the estimated depth of objects in the captured environment, from the camera that captured the corresponding subview. As in estimation of the world properties, depth maps may be generated via analysis of the video data and/or use of other data, such as known locations of objects within the environment and/or sensor data from other sensors such as LiDAR sensors.

Pursuant to the step 220, depth maps may be directly calculated for each of one or more subviews. Then, in the step 150, a confidence and/or influence map may be generated for each subview. As in the method 100, the confidence and/or influence map generated in the step 150 may be indicative of the confidence level in world properties such as the depth information contained in the depth maps estimated in the step 220. In the step 160, the virtual views may be generated using the captured image and/or video data, the estimated world properties, and the confidence/influence data associated with each captured ray bundle, as in the method 100. The method 200 may then end 190.

Tiled Camera Arrays

In some embodiments, the step 120 may be carried out with a tiled camera array. A tiled camera array is one type of light-field camera, which operates based on the use of multiple objective lenses, rather than a single objective lens with a microlens array, as in a plenoptic light-field camera.

Figure 3A:
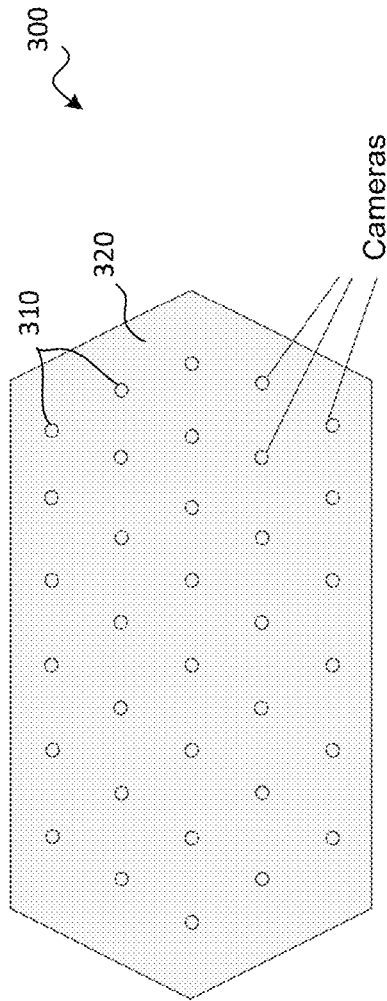
FIG. 3A shows an illustrative tiled camera array, as viewed from the front, according to one embodiment, with cameras are arranged in a hexagonal lattice on a planar surface.
Figure 3B:
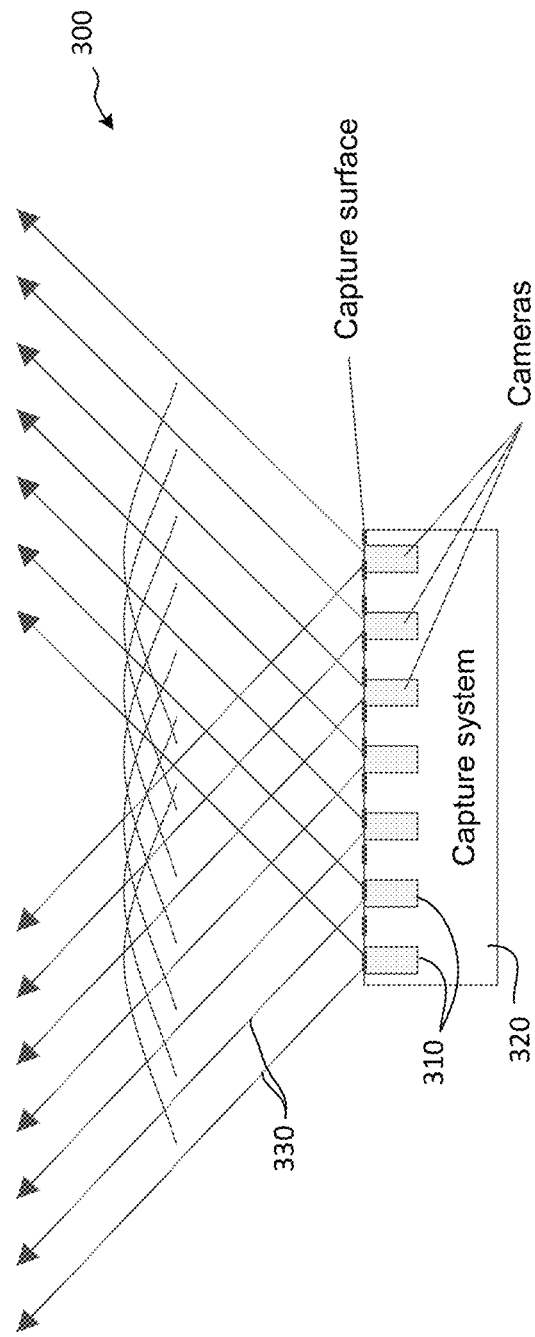
FIG. 3B shows the tiled camera array of FIG. 3A, as viewed from above, showing the overlapping fields-of-view of the subviews captured by the cameras.

FIGS. 3A and 3B depict an illustrative tiled camera array 300, as viewed from the front and the side, respectively, according to one embodiment. The tiled camera array 300 may have cameras 310 that are arranged in a hexagonal lattice on a planar surface 320 with overlapping fields-of-view 330.

Figure 4:
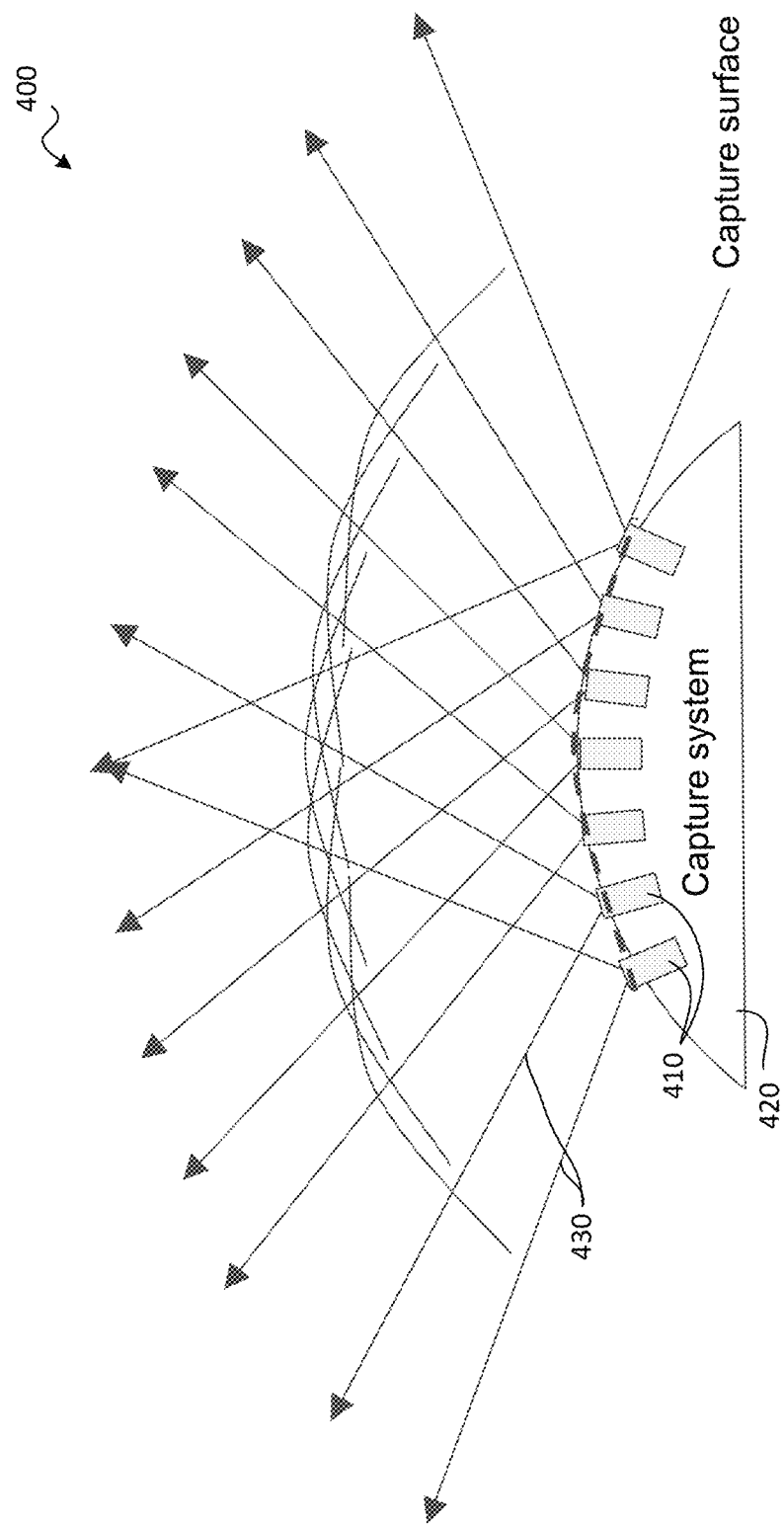
FIG. 4 shows an illustrative tiled camera array, as viewed from above, according to another embodiment, in which cameras are arranged on a convex surface, showing the overlapping fields-of-view of the subviews captured by the cameras.

FIG. 4 depicts an illustrative tiled camera array 400, as viewed from above, according to another embodiment, with cameras 410 arranged on a convex surface 420. The fields-of-view 430 of the cameras 410 overlap, but are oriented differently from each other to provide a more wide-angled combined field-of-view. FIG. 5 depicts the Lytro Immerge, as described above, which may be a tiled camera array of the type depicted in FIGS. 3A and 3B.

Tiered Camera Array

In some embodiments, the capture system used to carry out the step 120 is a tiled camera array that includes two or more tiers of camera types, and may thus be a tiered camera array. The cameras of each type may capture images and/or video at different resolutions. In some embodiments, the tiers may include a sparse set of cameras with high quality and resolution, and a more densely packed set of cameras with significantly lower resolution. Comparative examples will be shown and described below.

Figure 6:
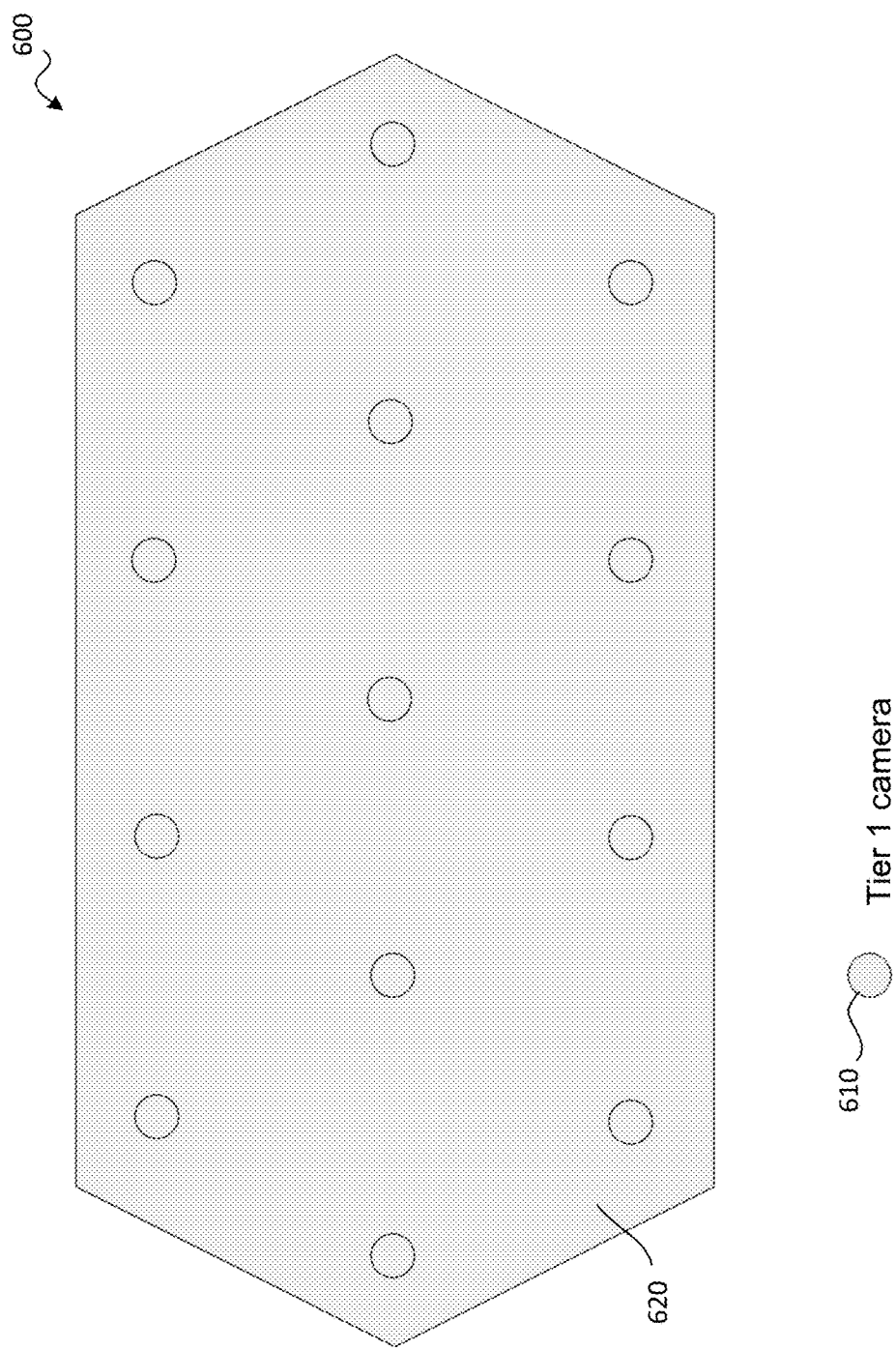
FIG. 6 is an illustrative example of a tiled camera array including a plurality of discrete cameras, according to one embodiment, in which all cameras are of the same type and have the same resolution.

FIG. 6 is an illustrative example of a tiled camera array 600 including a plurality of discrete cameras 610, according to one embodiment, in which all cameras are of the same type and have the same resolution. The tiled camera array 600 may have, for example, thirteen high resolution cameras, each of which captures images with 4000×4000 pixels, covering a capture surface 620 with an area of A m$^2$ (for example, if the spacing between cameras is 0.2 m$^2$, A is approximately 0.25 m$^2$). Each camera may have a field-of-view equal to F degrees (for example, 90 degrees). The total resolution is 208 MP.

Figure 7:
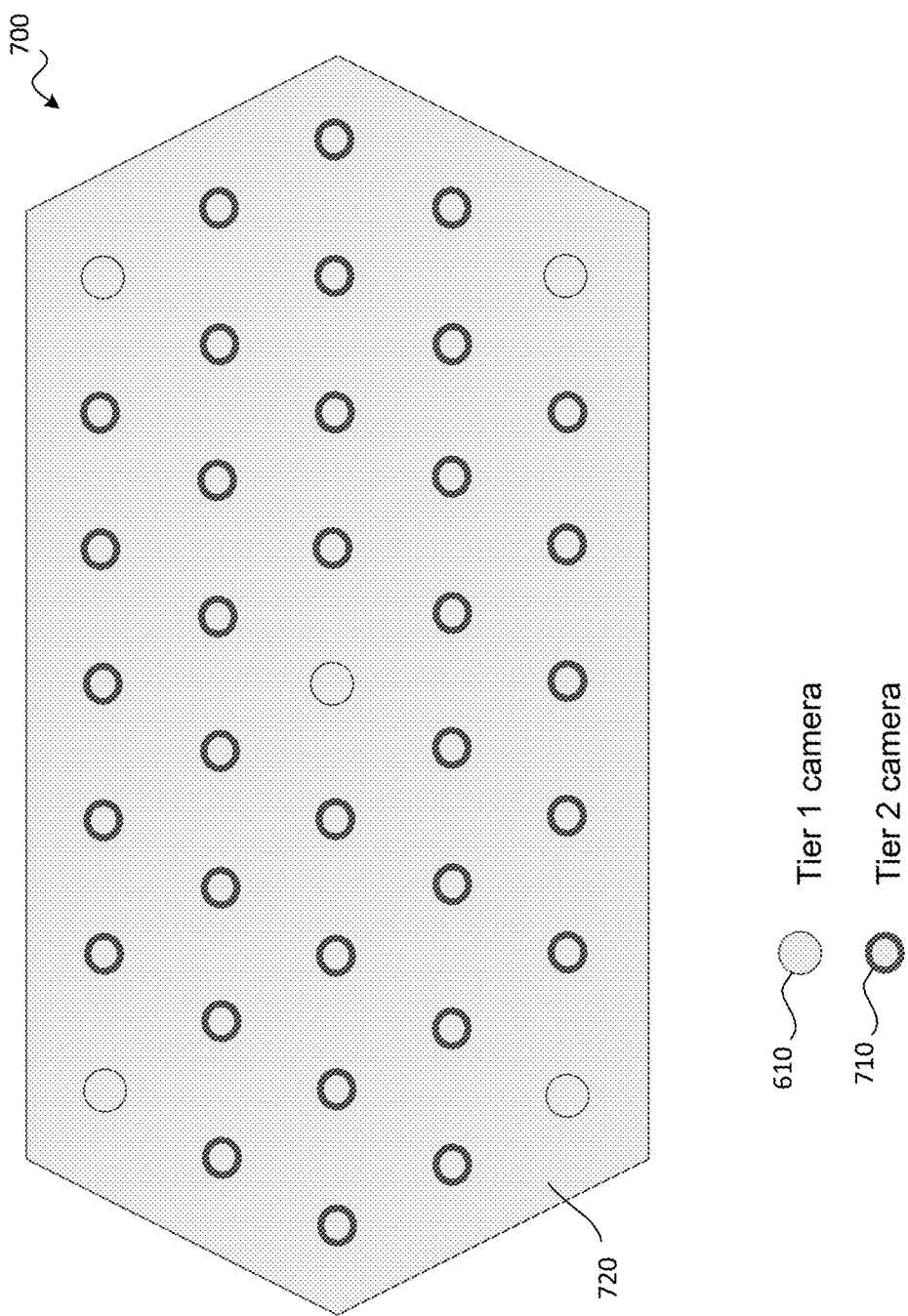
FIG. 7 is an illustrative example of a tiered camera array including two tiers of camera types, according to one embodiment.

FIG. 7 is an illustrative example of a tiered camera array 700 including two tiers of camera types, according to one embodiment. The cameras 610 of Tier 1 may have relatively higher resolution and lower density than the cameras 710 of Tier 2. As shown, the cameras 610 may be arranged in a hexagonal lattice, and the cameras 710 may also be arranged in a hexagonal lattice with voids that accommodate the cameras 610.

Specifically, the tiered camera array 700 may include five high resolution (Tier 1) cameras 610, each of which has a resolution of 4000×4000 pixels, and thirty-four lower resolution (Tier 2) cameras 710, each of which has a resolution of 1000×1000 pixels. The cameras 610 and the cameras 710 may cooperate to cover a capture surface 720 with an area of A m$^2$ (for example, the same area as covered in 600). Each of the cameras 610 and the cameras 710 may have a field-of-view equal to F degrees (for example, 90 degrees). The total resolution is 114 MP, and camera density is quadrupled relative to the configuration of FIG. 6, as depicted in FIG. 7.

Figure 8:
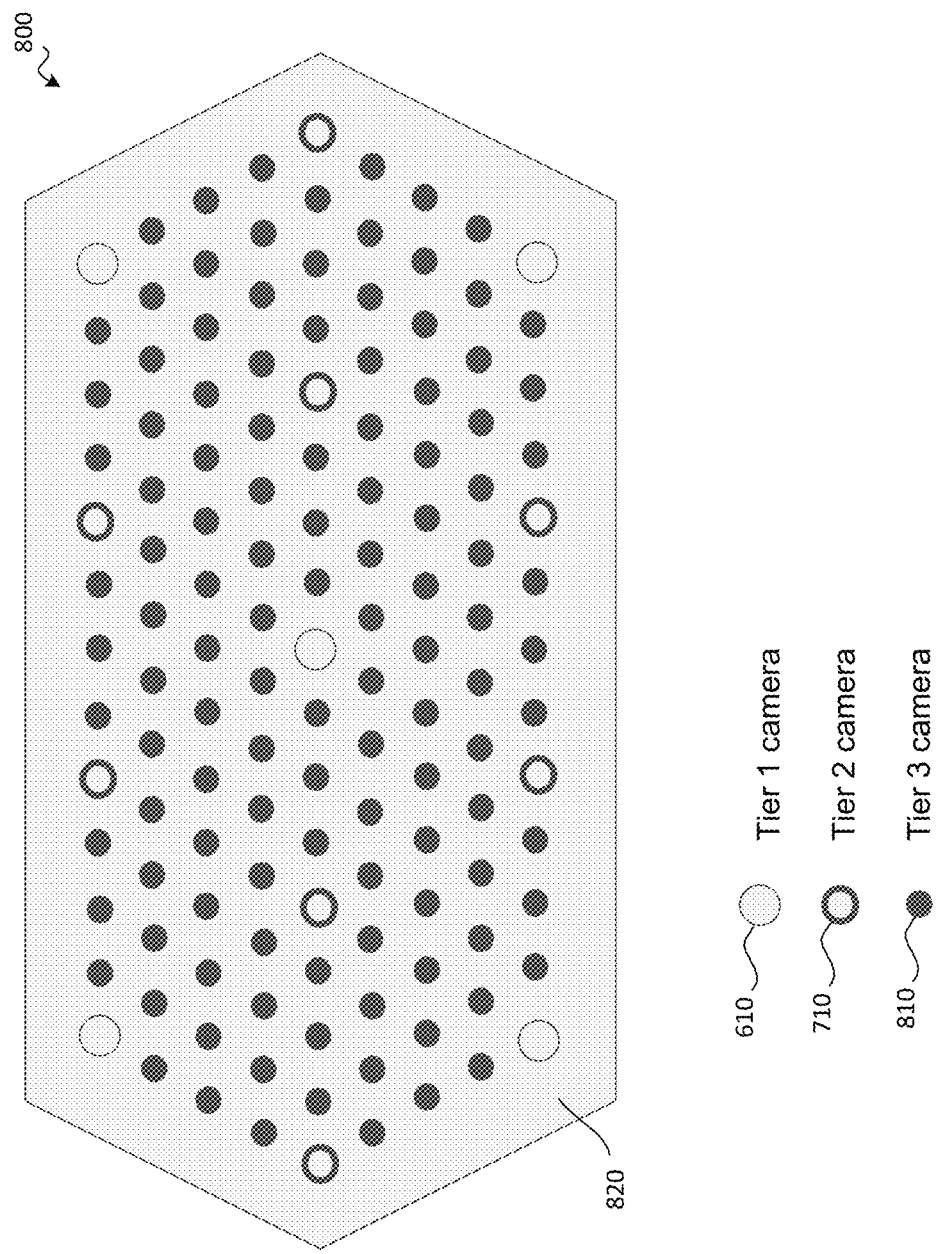
FIG. 8 is an illustrative example of a tiered camera array including three tiers of camera types, according to one embodiment.

FIG. 8 is an illustrative example of a tiered camera array 800 including three tiers of camera types, according to one embodiment. The cameras 610 of Tier 1 may have relatively higher resolution and lower density than the cameras 710 of Tier 2, which may have relatively higher resolution and lower density than the cameras 810 of Tier 3. As shown, the cameras 610 may be arranged in a hexagonal lattice, and the cameras 710 may also be arranged in a hexagonal lattice with voids that accommodate the cameras 610. The cameras 810 may be arranged in a hexagonal lattice with voids that accommodate the cameras 710 and the cameras 610.

Specifically, the tiered camera array 800 may have five high-resolution cameras 610 (Tier 1), each of which has a resolution of 4000×4000 pixels, ten lower resolution cameras 710 (Tier 2), each of which has a resolution of 1000×1000 pixels, and 118 very low resolution cameras 810 (Tier 3), each of which has a resolution of 500×500 pixels. The cameras 610, the cameras 710, and the cameras 810 may cooperate to cover a capture surface 820 with an area of A meters sq. Each of the cameras 610, the cameras 710, and the cameras 810 may have a field-of-view equal to F degrees. The total resolution is 119.5 MP, and camera density is raised by a factor of 16 relative to the configuration of FIG. 6, as depicted in FIG. 8.

In the exemplary tiered camera arrays 700 and 800 shown in FIGS. 7 and 8, respectively, the camera density is significantly higher while the aggregate pixel count is significantly lower when compared to the tiled camera array 600 shown in FIG. 6. Thus, the tiered camera arrays 700 and 800 may serve to reduce computation, storage, and data transmission requirements while enhancing the accuracy of interpolations needed to render virtual views. The presence of the high-resolution cameras 610 may enable the virtual views to also have high resolution, at least in regions where confidence in the world properties is relatively high.

Notably, the term "resolution" in cameras may often be used to describe the pixel count of the captured images. When comparing cameras with similar or identical fields-of-view, the pixel count may be adequate information to determine which camera may better resolve a specific object. However, in the case that the fields-of-view of the cameras are not comparable, pixel count may not be the most important factor. In this disclosure, resolution may be considered to correspond with the angular field-of-view covered by single pixel in a camera. For example, a camera that contains a field-of-view of 50° and a 100×100 pixel array may be considered to have approximately double the resolution of a camera that contains a field-of-view of 100° and the same 100×100 pixel array.

Notably, all the examples of tiered camera arrays described above contain cameras arranged in a regular pattern (for example, a hexagonal lattice). However, such an arrangement is merely illustrative, and any camera layout, including irregular patterns, may be used.

In various embodiments, other configurations can be used. By providing tiers of cameras of different resolutions, high camera densities can be achieved while potentially decreasing overall pixel counts.

Resource usage can scale differently depending on pixel count. Storage and bandwidth may generally scale linearly with pixel counts. Data processing requirements may scale according to a more complicated relationship; however, in general, more pixels increases processing time and complexity. In addition, costs for higher resolution cameras may be dramatically higher than costs for low resolution cameras. Accordingly, the techniques described herein can significantly decrease capital and/or operating costs involved in manufacturing and/or using the capture system.

Estimation of World Properties

Pursuant to the step 130 and/or the step 220, various aspects of the world may be estimated, some better than others. In at least one embodiment, the system estimates any or all of the following world properties, in any suitable combination:

- The 3D shapes and/or positions of objects appearing in the video data. Estimation of such geometric information is related to depth estimation and disparity estimation. See, for example, Furukawa et al., "Accurate, Dense and Robust Multi-View Stereopsis," IEEE Transactions on Pattern Analysis and Machine Intelligence (Volume: 32, Issue: 8, August 2010) for one method of estimating 3D properties from many camera views.
- Surface reflectance for objects appearing in the video data. See, for example, Yoon et al., "Joint Estimation of Shape and Reflectance using Multiple Images with Known Illumination Conditions", International Journal of Computer Vision, Springer Verlag, 2010, 86 (2-3), pp. 192-210.
- Semi-reflective elements (like glass windows) of objects appearing in the video data. See, for example, Xue et al., "A Computational Approach for Obstruction-Free Photography", available at https://sites.google.com/site/obstructionfreephotography/
- Other properties of objects appearing in the video data, such as translucency, index of refraction, and/or the like.
- Volumetric effects appearing in the video data, such as smoke, fire, and/or the like.
- Integration of estimated world properties from other sources. For example, such other sources may include LiDAR sensors, structured light sensors, and/or 3D models of the scene.

In some embodiments, in the step 130 and/or the step 220, depth maps are estimated for all subviews. See, for example, the Middlebury Multi-View Stereo benchmark (http://vision.middlebury.edu/mview/), a dataset and benchmark that evaluates a variety of methods and contains numerous publications and sets of sample code.

Evaluation of Confidence in World Estimates

In at least one embodiment, the system creates a world model and then, pursuant to the step 140, based on the world model, makes a determination as to a quality metric and/or confidence value of interpolations based on that world model. The quality metric and/or confidence value may later be used to decide which ray bundle data to use in rendering virtual views.

In at least one embodiment, when world properties are estimated, the estimated properties also include an error metric and/or confidence value corresponding to the estimated property. For example, such an error metric may be a measure of the photometric consistency of an estimated 3D patch in the world. If all the subviews in which the patch appears have a high degree of agreement regarding the characteristics of the patch, relative to other possibilities, there may be high confidence in the accuracy of the estimate. If the characteristics of the patch differ significantly between the subviews, as may occur with many visually complex objects and instances in which the world estimate is incorrect, then the confidence value may be low.

In at least one embodiment, the confidence value of a patch may be calculated by comparing the photometric consistency cost with the estimated properties (for example, the 3D location and orientation of the patch) against other possible positions and/or orientations. In one embodiment, the set of possible positions for a patch of pixels may be generated by sampling along the ray bundles corresponding to the pixels in the patch from the perspective of a reference camera. Each pixel in the patch contains light from a specific direction relative to the camera, which may be specified by a geometric ray equation. The patch locations may be generated by sampling at different distances along the ray from the reference camera origin. In one embodiment, a confidence score is computed that is a relative comparison of the photometric consistency cost at the estimated location relative to the lowest local cost minima of the other considered locations, as follows:

confidence=(other_minima−photo_cost)/other_minima

In the case where the current cost is the lowest for the patch of the considered possibilities, the patch location may be considered to be the estimated 3D position. Confidence scores may have a value between 0 and 1, where 1 may represent high confidence. Other value scales for confidence may be used.

Figure 9:
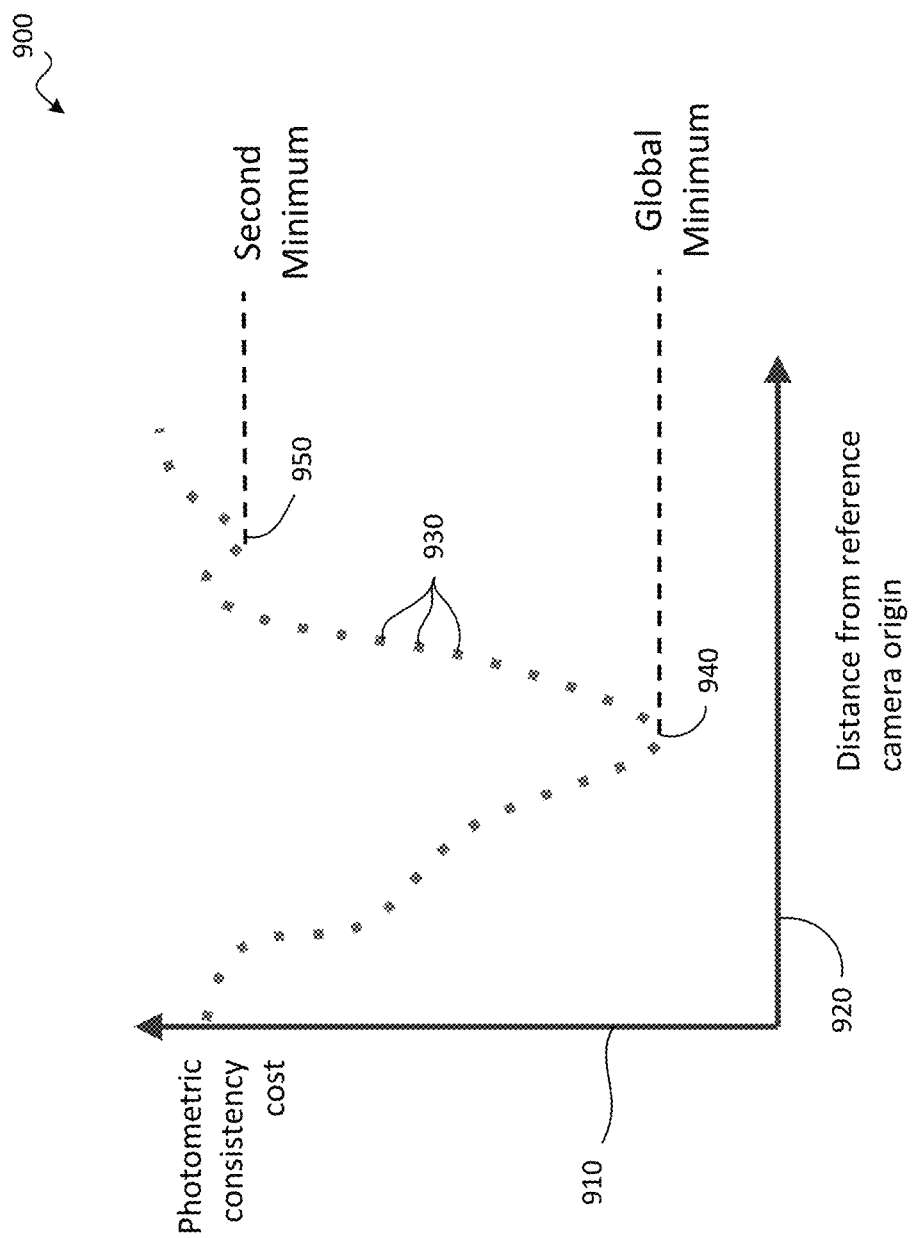
FIG. 9 is a plot depicting exemplary data for a calculated high confidence score for a patch of an environment captured in the light-field data, as viewed from a subview of the video data, according to one embodiment.

FIG. 9 is a plot 900 depicting exemplary data for a calculated high confidence score for a patch of an environment captured in the light-field data, as viewed from a subview of the video data, according to one embodiment. The plot 900 displays photometric consistency costs on the vertical axis 910 and distance on the horizontal axis 920. Each dot 930 marks the photometric consistency score for a possible distance (and hence location) of the patch. The global minimum 940 of a plurality of candidate locations is marked; this may represent the position used as an estimate of the 3D location of the patch. The second minimum 950 is also marked. When values are entered into the equation above, a confidence score near 1 may be produced.

Figure 10:
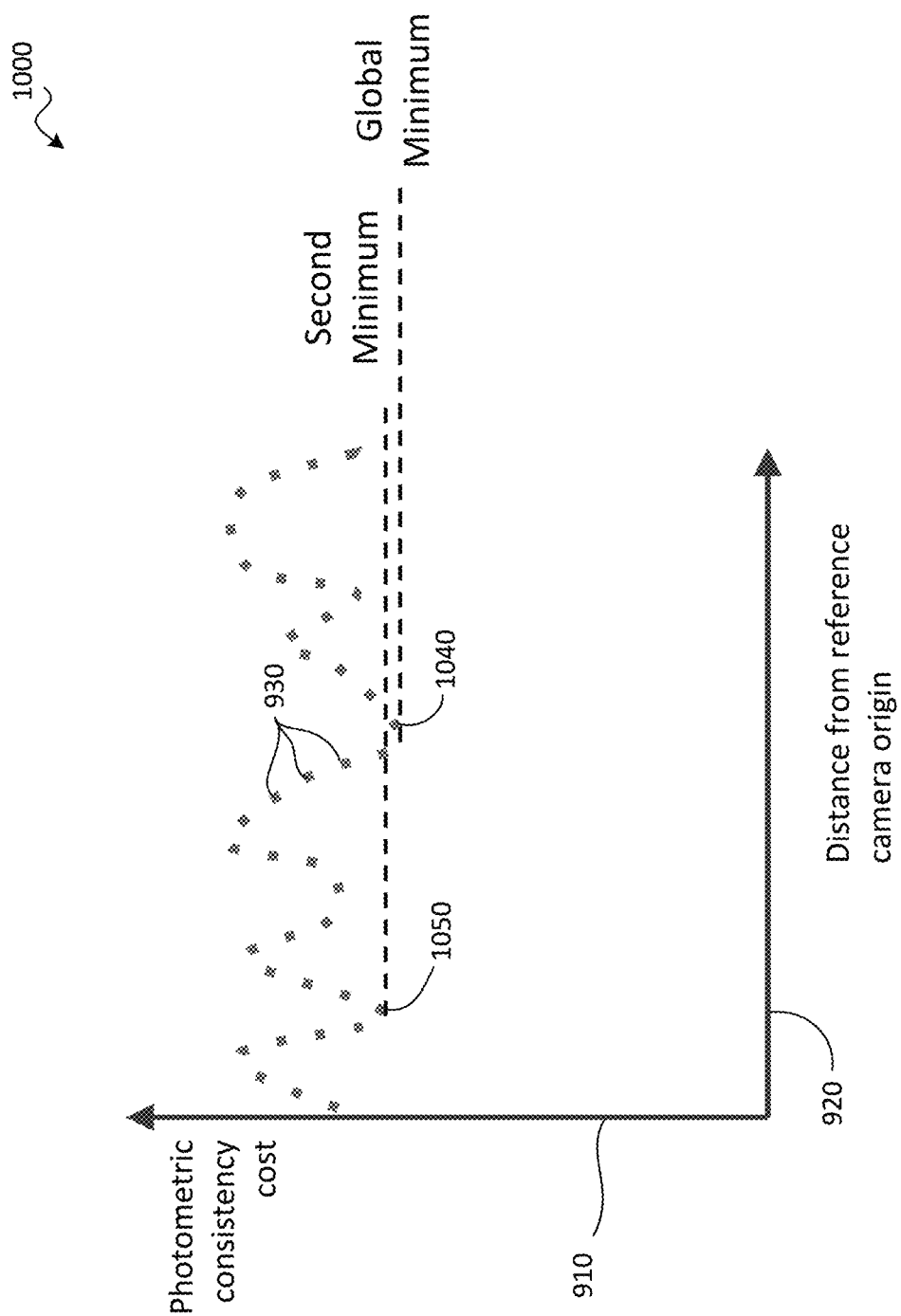
FIG. 10 is a plot depicting exemplary data for a calculated low confidence score for a patch of an environment captured in the light-field data, as viewed from a subview of the video data, according to one embodiment.

In contrast, FIG. 10 is a plot 1000 depicting exemplary data for a calculated low confidence score for a patch of an environment captured in the light-field data, as viewed from a subview of the video data, according to one embodiment. A global minimum 1040 and second minimum 1050 are marked, and the confidence score in this case would be near 0. Low confidence values may be generated when photometric consistency metrics have difficulty determining the proper location of the patch (for example, due to low contrast surfaces or view-dependent lighting).

Notably, for clarity, FIGS. 9 and 10 depict graphs in 2 dimensions, including distance and cost. In many instances, the dimensionality of the data considered in the confidence calculation may be higher (including, for example, distance, orientation, and cost), but the method may remain substantially the same.

In at least one embodiment, one measure of quality and/or confidence is photometric consistency, as described in Furukawa et al., "Accurate, Dense and Robust Multi-View Stereopsis," IEEE Transactions on Pattern Analysis and Machine Intelligence (Volume: 32, Issue: 8, August 2010). Patches having higher photometric consistency can be considered to have higher quality and/or confidence value.

In at least one embodiment, once a model has been generated, the system evaluates the quality of the model. Quality/confidence evaluation may additionally or alternatively be performed during model estimation.

In at least one embodiment, the following algorithm can be used for evaluating quality and/or confidence in a model, by projecting the color data from one subview onto another using the estimated world properties and then comparing the color values in projected virtual view to the capture subview:

Start with the image_GROUNDTRUTH from a reference camera, camera_REFERENCE. This is a subview from a camera at a particular location and orientation, and is treated as "ground truth" for the following comparison.

Then, for other cameras with overlapping fields-of-view:
Perform image-based rendering, using the estimated world properties, to virtually render the data from the other camera, camera_OTHER as viewed from camera_REFERENCE
image_RENDER=render(image_OTHER, worldProperties, transform_REFERENCE_from_OTHER)
transform_REFERENCE_from_OTHER maps the pose and camera properties of one camera to another. This can be calculated, for example, as part of system calibration or determined via known methods like "bundle adjustment," and may be part of the capture system calibration data.
The "render" function may be identical or substantially identical to the render function used for interpolation in the system during playback. Any known mechanism for 3D rendering can be used to cover the basic case where world estimation is limited to 3D properties.
Compare pixels between image_GROUNDTRUTH and image_RENDER. Confidence/quality is proportional to the similarity of pixel values in areas of overlap.
Some areas may not have overlap, due to mismatched field-of-view and/or occluding objects. No confidence values are generated for those regions.
In at least one embodiment, confidence/quality is tracked back to the estimated world properties and accumulated from numerous comparisons. For example, for an estimated 3D model, each atomic unit of the model (such as a point, triangle in a mesh, or the like) can receive a confidence/quality score.

Figure 11A:
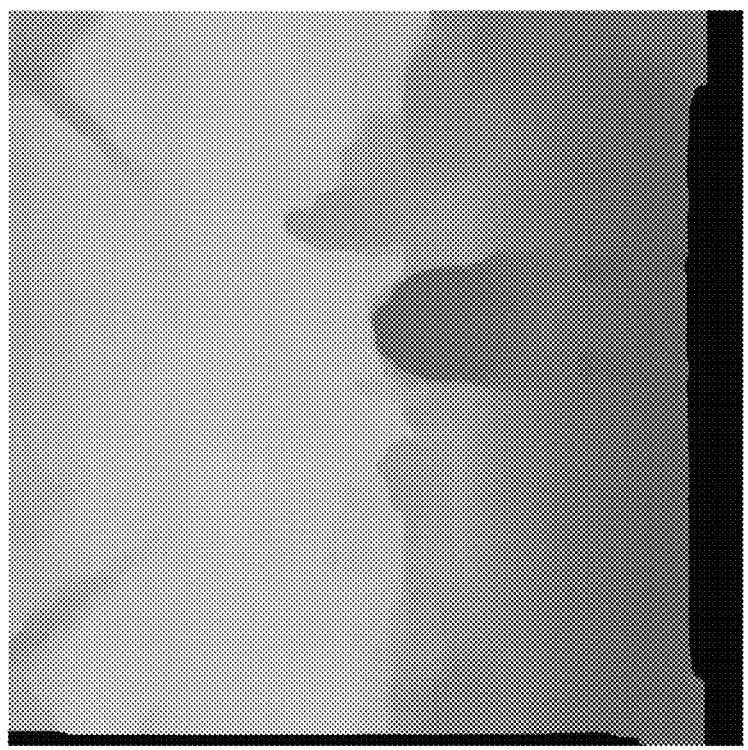
FIG. 11A shows an exemplary subview from a camera in an array light-field capture system, according to one embodiment.

Examples are shown in FIGS. 11A to 13. FIG. 11A shows an exemplary subview 1100 from a camera in an array light-field capture system, according to one embodiment. Relative to the description above, the subview 1100 in FIG. 11A may be considered from camera_OTHER.

Figure 11B:
FIG. 11B is a depth map generated from the viewpoint of the camera used to capture the image in FIG. 11A, according to one embodiment.

FIG. 11B is a depth map 1150 generated from the viewpoint of the camera used to capture the image in FIG. 11A, according to one embodiment. In the visual representation, darker colors represent nearer distances, while lighter colors represent further distances. Notably, the depth map may be considered a specific instance of estimated world properties that contains 3D positional estimates for individual ray bundles. Accordingly, FIG. 11B may be a visual representation of a depth map generated from the viewpoint of camera_OTHER.

Figure 12A:
FIG. 12A is an exemplary projection of the color image shown in camera 11A, using the depth map shown in 11B and the capture system calibration data, to a virtual viewpoint, according to one embodiment.

FIG. 12A is an exemplary projection 1200 of the color image shown in FIG. 11A, using the depth map shown in FIG. 11B and the capture system calibration data, to a virtual viewpoint, according to one embodiment. Notably, there are clearly visible errors in the projection of the head a shoulders area. Accordingly, FIG. 12A may be an exemplary image_RENDER, and may be the result of rendering the subview from camera_OTHER, based on the transform_REFERENCE_from_OTHER and the estimated world properties (in this case, the depth map).

Figure 12B:
FIG. 12B shows an exemplary subview from a camera in an array light-field capture system, according to one embodiment.

FIG. 12B shows an exemplary subview 1250 from a camera in an array light-field capture system, according to one embodiment. The location of this subview may be nearly identical with the virtual viewpoint used to compute FIG. 12A. Accordingly, FIG. 12B may contain the subview from camera REFERENCE, and may be an example of image_GROUNDTRUTH. Notably, if image_RENDER and image_GROUNDTRUTH are compared, some areas may match very well, while some areas may match very poorly.

Figure 13:
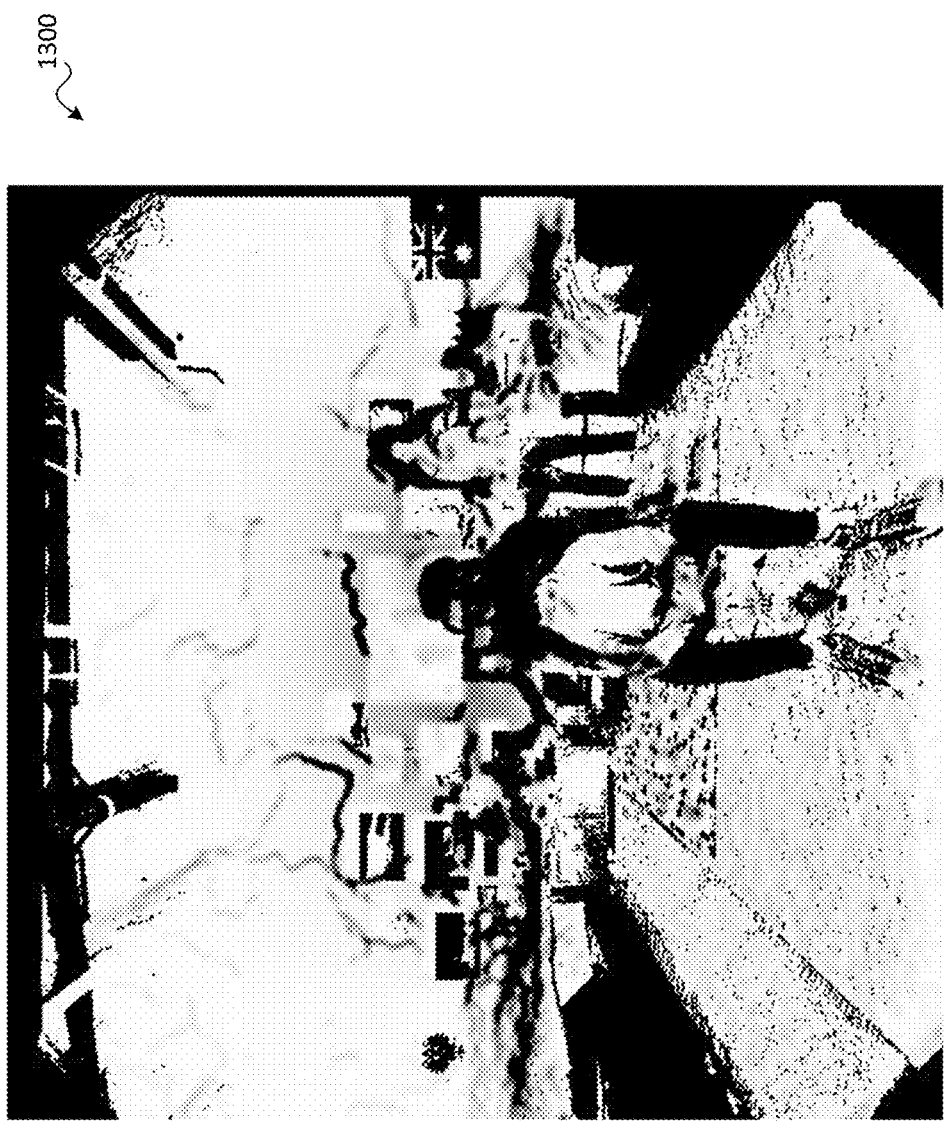
FIG. 13 shows an exemplary confidence map, projected identically to the image in FIG. 11A, according to one embodiment.

FIG. 13 shows an exemplary confidence map 1300, projected identically to the image in FIG. 11A, according to one embodiment. Accordingly, FIG. 13 may contain the confidence map generated by comparing image_RENDER to image_GROUNDTRUTH. White areas represent high confidence values, while dark areas represent low confidence values.

Notably, the examples provided above use only two cameras for clarity. In practice, every camera may be compared against a plurality of other cameras. The final confidence and/or quality scores may be computed as any function of all the inputs (for example, the minimum, mean, or median values may be used).

Virtual View Generation

Pursuant to the step 160, virtual views may be generated (i.e., "reconstructed") in various ways. In at least one embodiment, virtual camera images may be generated using depth image based rendering (DIBR). In this approach, virtual views may be reconstructed at any virtual camera position and/or orientation within the light-field volume. Color image data from the subviews may be warped and/or projected into the virtual camera view using the estimated world properties (for example, including depth), and the capture system calibration data.

In at least one embodiment, where a tiered camera array is used, generation of the virtual view may proceed with reference to the confidence value for each ray bundle. For example, for each ray bundle in the high quality camera set (i.e., a pixel value from a single capture camera), if the confidence value is high (i.e., estimated world properties associated with that ray are of high quality and/or confidence), then the system may use the ray bundle with a high influence value. Conversely, if the confidence value is low, either the ray is not used, or it is assigned a low influence value. For example, ray influence may be assigned in the following manner to the high quality camera set:

if (confidence>High_C)
    influence=1
else if (confidence>Low_C
    influence=(confidence-Low_C)/(High_C-Low_C)
else
    in-Fluence=0

In one embodiment, High_C may be equal to 0.5 and Low_C may be equal to 0.3. Of course, this assignment of influence is exemplary, and many other assignment functions may be used.

In at least one embodiment, depth image based rendering may be performed using the data corresponding to the Tier 1 cameras. The reconstruction may be performed according to any existing methods, and may further include the influence channel in the reconstructed image. In one embodiment, the output may be a four-channel image with red, green, blue, and influence. Further, depth image based rendering may be separately performed on the other tiers of cameras.

The reconstructed images may then be combined by treating the influence channel as a typical alpha channel, and successively performing the SRC_OVER operation, where the lowest tier camera data may be considered the source. After combination, if any pixels remain with influence values below 1, the system may fill those pixels with data from the highest tier reconstructed image (lowest resolution), using any existing hallucination or fill algorithm, or any other approach.

For example, as mentioned previously, FIG. 12A is an exemplary projection 1200 of the color image shown in FIG. 11A, using the depth map shown in FIG. 11B and the capture system calibration data, to a virtual viewpoint. Notably, there are clearly visible errors in the projection of the head a shoulders area. FIG. 13 shows an exemplary confidence map 1300, projected identically to the exemplary projection 1200 in FIG. 12A. For the purposes of this example, FIG. 13 may also represent the influence map where the influence of a region of a subview is directly proportional to the confidence level in the associated world properties. In some embodiments, this may not be the case, as influence may have a nonlinear relationship with confidence; thus, the influence map may be based on the confidence map, but may not have the same appearance.

Figure 14A:
FIG. 14A shows the projected image from 12A, using the confidence data from 13 to assign a per-pixel influence value to use in image reconstruction, according to one embodiment.

FIG. 14A shows the projected image 1400 from FIG. 12A, using the confidence data from FIG. 13 to assign a per-pixel influence value to use in image reconstruction, according to one embodiment. For exemplary purposes, the color values have been pre-multiplied by the influence values to illustrate which data may be used and which may be ignored as part of image reconstruction.

Figure 14B:
FIG. 14B shows the projected image from another subview, according to one embodiment.

FIG. 14B shows the projected image 1450 from another subview, according to one embodiment. This subview may be a camera from a tier consisting of relatively lower resolution and higher density (for example, a Tier 2 or Tier 3 camera in the exemplary camera systems of FIGS. 7 and 8). The projection, compared to FIG. 12A, is of significantly lower resolution, but also contains significantly less projection error.

Figure 15:
FIG. 15 shows a merged projected image, based on the color data shown in FIGS. 14A and 14B, according to one embodiment.

FIG. 15 shows a merged projected image 1500, based on the color data shown in FIGS. 14A and 14B, according to one embodiment. The color data from FIG. 14A has been preferentially selected, using color data from FIG. 14B to fill in regions of that are missing information and/or have information with low confidence (due to low confidence and/or occlusion). The color data shown in FIGS. 14A and 14B may be combined using the SRC_OVER operation, where FIG. 14A is the SRC image, FIG. 13 represents the source alpha channel, and FIG. 12B is the DST image. Notably, while this example uses only two subviews from two tiers for clarity, the approach may be used on an arbitrary number of subviews from an arbitrary number of tiers.

In at least one embodiment, during reconstruction, the system uses rays requiring the least interpolation (which will generally be from lower quality but more densely packed cameras) to fill in areas of the virtual view with low confidence/high error in the estimated world properties. In at least one embodiment, a tiered approach may be used, in which more than two types of camera are used. Using such an approach, high confidence is associated with highest resolution, midconfidence is associated with mid-level resolution, and low or no confidence is associated with low resolution. Additional tiers may also be provided, if appropriate.

In at least one embodiment, the system blends regions of low confidence with those of high confidence, so as not to introduce undesirable artifacts. For example, small amounts of local filtering and/or blending can be used in the final rendering of images. As a specific example, a five-pixel blending zone may be used to smooth the change from one resolution level to another.

Using the above-described techniques, most areas of the scene may be fully reconstructed from the high resolution data with excellent results. Difficult areas, like specular reflections, transparent objects, and textureless surfaces, may be reconstructed generally using the lower resolution data. While the captured resolution is lower, the overall quality in those regions may be significantly higher because minimal (incorrect) interpolation is performed.

The above description and referenced drawings set forth particular details with respect to possible embodiments. Those of skill in the art will appreciate that the techniques described herein may be practiced in other embodiments. First, the particular naming of the components, capitalization of terms, the attributes, data structures, or any other programming or structural aspect is not mandatory or significant, and the mechanisms that implement the techniques described herein may have different names, formats, or protocols. Further, the system may be implemented via a combination of hardware and software, as described, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

Some embodiments may include a system or a method for performing the above-described techniques, either singly or in any combination. Other embodiments may include a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions of described herein can be embodied in software, firmware and/or hardware, and when embodied in software, can be downloaded to reside on and be operated from different platforms used by a variety of operating systems.

Some embodiments relate to an apparatus for performing the operations described herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, flash memory, solid state drives, magnetic or optical cards, application specific integrated circuits (ASICs), and/or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the techniques set forth herein are not described with reference to any particular programming language. It will be appreciated that a variety of programming languages may be used to implement the techniques described herein, and any references above to specific languages are provided for illustrative purposes only.

Accordingly, in various embodiments, the techniques described herein can be implemented as software, hardware, and/or other elements for controlling a computer system, computing device, or other electronic device, or any combination or plurality thereof. Such an electronic device can include, for example, a processor, an input device (such as a keyboard, mouse, touchpad, trackpad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or nonportable. Examples of electronic devices that may be used for implementing the techniques described herein include: a mobile phone, personal digital assistant, smartphone, kiosk, server computer, enterprise computing device, desktop computer, laptop computer, tablet computer, consumer electronic device, television, set-top box, or the like. An electronic device for implementing the techniques described herein may use any operating system such as, for example: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google, Inc. of Mountain View, Calif.; and/or any other operating system that is adapted for use on the device.

In various embodiments, the techniques described herein can be implemented in a distributed processing environment, networked computing environment, or web-based computing environment. Elements can be implemented on client computing devices, servers, routers, and/or other network or non-network components. In some embodiments, the techniques described herein are implemented using a client/server architecture, wherein some components are implemented on one or more client computing devices and other components are implemented on one or more servers. In one embodiment, in the course of implementing the techniques of the present disclosure, client(s) request content from server(s), and server(s) return content in response to the requests. A browser may be installed at the client computing device for enabling such requests and responses, and for providing a user interface by which the user can initiate and control such interactions and view the presented content.

Any or all of the network components for implementing the described technology may, in some embodiments, be communicatively coupled with one another using any suitable electronic network, whether wired or wireless or any combination thereof, and using any suitable protocols for enabling such communication. One example of such a network is the Internet, although the techniques described herein can be implemented using other networks as well.

While a limited number of embodiments has been described herein, those skilled in the art, having benefit of the above description, will appreciate that other embodiments may be devised which do not depart from the scope of the claims. In addition, it should be noted that the language used in the specification has been principally selected for readability and instructional purposes, and may not have been selected to delineate or circumscribe the inventive subject matter. Accordingly, the disclosure is intended to be illustrative, but not limiting.

What is claimed is:

1. A method for generating a virtual view of an environment, the method comprising:
    with a light-field camera system, capturing video data depicting the environment, the video data comprising a plurality of subviews that provide a plurality of views of the environment;
    computing estimated world properties of the environment;
    for each of the subviews, generating a confidence map indicative of a level of confidence in the estimated world properties of each of a plurality of regions within the subview, wherein generating the confidence map comprises generating a tertiary confidence map for a tertiary subview; and
    using the subviews and the confidence maps to generate the virtual view, wherein using the subviews and the confidence maps comprises selecting, for inclusion in the virtual view, one or more regions of the tertiary subview having higher confidence in the tertiary confidence map than corresponding regions of a secondary confidence map.

2. The method of claim 1, wherein computing the estimated world properties comprises ascertaining one or more shapes of one or more objects appearing in the environment.

3. The method of claim 2, wherein computing the estimated world properties further comprises, for each of the subviews, generating a depth map indicative of distance between one or more objects appearing in the subview, and the one of a plurality of cameras of the light-field cameras system, to which the subview pertains.

4. The method of claim 1, wherein computing the estimated world properties comprises ascertaining a reflectance of at least part of one or more objects appearing in the environment.

5. The method of claim 1, wherein computing the estimated world properties comprises ascertaining a specularity of at least part of one or more objects appearing in the environment.

6. The method of claim 1, wherein computing the estimated world properties comprises ascertaining at least one of a translucency of at least part of one or more objects appearing in the environment.

7. The method of claim 1, further comprising, for each of the subviews, prior to generating the confidence map, calculating a confidence level for each of the plurality of regions of the subview.

8. The method of claim 7, wherein calculating the confidence level for each of the plurality of regions comprises, for each region, comparing a first subset of the video data corresponding to the region with one or more other subsets of the video data from other subviews that depict a portion of the environment similar to that depicted in the region.

9. The method of claim 1, wherein:
    the light-field camera system comprises a tiled camera array comprising a plurality of cameras; and
    capturing the video data comprises capturing one of the subviews with each of the cameras.

10. The method of claim 9, wherein:
    generating the confidence map for each of the plurality of subviews comprises:
        generating a primary confidence map for a primary subview of the plurality of subviews; and
        generating the secondary confidence map for a secondary subview of the plurality of subviews; and
    using the confidence maps and the subviews to generate the virtual view comprises:
        selecting, for inclusion in the virtual view, one or more regions of the primary subview having high confidence in the primary confidence map; and
        selecting, for inclusion in the virtual view, one or more regions of the secondary subview having higher confidence in the secondary confidence map than corresponding regions of the primary confidence map.

11. The method of claim 10, wherein:
    the plurality of cameras comprises:
        a first plurality of cameras, each of which has a first resolution; and
        a second plurality of cameras, each of which has a second resolution lower than the first resolution; and
    capturing the video data comprises:
        capturing the primary subview with one of the first plurality of cameras; and
        capturing the secondary subview with one of the second plurality of cameras.

12. The method of claim 11, wherein:
    the plurality of cameras further comprises a third plurality of cameras, each of which has a third resolution lower than the second resolution;
    capturing the video data comprises capturing the tertiary subview with one of the third plurality of cameras.

13. A non-transitory computer-readable medium for generating a virtual view of an environment, the non-transitory computer-readable medium comprising instructions stored thereon, that when executed by a processor, perform the steps of:
- receiving video data depicting the environment after capture of the video data by a light-field camera system, the video data comprising a plurality of subviews that provide a plurality of views of the environment;
- computing estimated world properties of the environment;
- for each of the subviews, generating a confidence map indicative of a level of confidence in the estimated world properties of each of a plurality of regions within the subview, wherein generating the confidence map comprises generating a tertiary confidence map for a tertiary subview; and
- using the subviews and the confidence maps to generate the virtual view, wherein using the subviews and the confidence maps comprises selecting, for inclusion in the virtual view, one or more regions of the tertiary subview having higher confidence in the tertiary confidence map than corresponding regions of a secondary confidence map.

14. The non-transitory computer-readable medium of claim 13, wherein computing the estimated world properties comprises ascertaining one or more shapes of one or more objects appearing in the environment.

15. The non-transitory computer-readable medium of claim 13, wherein computing the estimated world properties further comprises, for each of the subviews, generating a depth map indicative of distance between one or more objects appearing in the subview, and the one of a plurality of cameras of the light-field camera system, to which the subview pertains.

16. The non-transitory computer-readable medium of claim 13, wherein computing the estimated world properties comprises at least one of:
- ascertaining a reflectance of at least part of one or more objects appearing in the environment;
- ascertaining a specularity of at least part of one or more objects appearing in the environment; and
- ascertaining at least one of a translucency of at least part of one or more objects appearing in the environment.

17. The non-transitory computer-readable medium of claim 13, further comprising instructions stored thereon, that when executed by a processor, for each of the subviews, prior to generating the confidence map, calculate a confidence level for each of the plurality of regions of the subview by, for each region, comparing a first subset of the video data corresponding to the region with one or more other subsets of the video data from other subviews that depict a portion of the environment similar to that depicted in the region.

18. The non-transitory computer-readable medium of claim 13, wherein:
- the light-field camera system comprises a tiled camera array comprising a plurality of cameras; and
- the non-transitory computer-readable medium further comprises instructions stored thereon, that when executed by a processor, cause the light-field camera system to capture the video data by capturing one of the subviews with each of the cameras.

19. The non-transitory computer-readable medium of claim 18, wherein:
- generating the confidence map for each of the plurality of subviews comprises:
  - generating a primary confidence map for a primary subview of the plurality of subviews; and
  - generating the secondary confidence map for a secondary subview of the plurality of subviews; and
- using the confidence maps and the subviews to generate the virtual view comprises:
  - selecting, for inclusion in the virtual view, one or more regions of the primary subview having high confidence in the primary confidence map; and
  - selecting, for inclusion in the virtual view, one or more regions of the secondary subview having higher confidence in the secondary confidence map than corresponding regions of the primary confidence map.

20. The non-transitory computer-readable medium of claim 19, wherein:
- the plurality of cameras comprises:
  - a first plurality of cameras, each of which has a first resolution; and
  - a second plurality of cameras, each of which has a second resolution lower than the first resolution; and
- capturing the video data comprises:
  - capturing the primary subview with one of the first plurality of cameras; and
  - capturing the secondary subview with one of the second plurality of cameras.

21. The non-transitory computer-readable medium of claim 20, wherein:
- the plurality of cameras further comprises a third plurality of cameras, each of which has a third resolution lower than the second resolution;
- capturing the video data comprises capturing the tertiary subview with one of the third plurality of cameras.

22. A system for generating a virtual view of an environment, the system comprising:
- a light-field camera system configured to capture video data depicting the environment, the video data comprising a plurality of subviews that provide a plurality of views of the environment; and
- a processor configured to:
  - compute estimated world properties of the environment;
  - for each of the subviews, generate a confidence map indicative of a level of confidence in the estimated world properties of each of a plurality of regions within the subview, wherein the processor is further configured to generate the confidence map for each of the plurality of subviews by generating a tertiary confidence map for a tertiary subview;
  - use the subviews and the confidence maps to generate the virtual view, wherein the processor is further configured to use the confidence maps and the subviews to generate the virtual view by selecting, for inclusion in the virtual view, one or more regions of the tertiary subview having higher confidence in the tertiary confidence map than corresponding regions of a secondary confidence map.

23. The system of claim 22, wherein the processor is further configured to compute the estimated world properties by ascertaining one or more shapes of one or more objects appearing in the environment.

24. The system of claim 23, wherein the processor is further configured to compute the estimated world properties by, for each of the subviews, generating a depth map indicative of distance between one or more objects appearing in the subview, and the one of a plurality of cameras of the light-field camera system, to which the subview pertains.

25. The system of claim 22, wherein the processor is further configured to compute the estimated world properties by performing at least one of:
- ascertaining a reflectance of at least part of one or more objects appearing in the environment;
- ascertaining a specularity of at least part of one or more objects appearing in the environment; and
- ascertaining at least one of a translucency of at least part of one or more objects appearing in the environment.

26. The system of claim 22, wherein the processor is further configured, for each of the subviews, prior to generating the confidence map, to calculate a confidence level for each of the plurality of regions of the subview by, for each region, comparing a first subset of the video data corresponding to the region with one or more other subsets of the video data from other subviews that depict a portion of the environment similar to that depicted in the region.

27. The system of claim 22, wherein:
- the light-field camera system comprises a tiled camera array comprising a plurality of cameras; and
- the light-field camera system is configured to capture the video data by capturing one of the subviews with each of the cameras.

28. The system of claim 27, wherein:
the processor is further configured to generate the confidence map for each of the plurality of subviews by:
- generating a primary confidence map for a primary subview of the plurality of subviews; and
- generating the secondary confidence map for a secondary subview of the plurality of subviews; and the processor is further configured to use the confidence maps and the subviews to generate the virtual view by:
- selecting, for inclusion in the virtual view, one or more regions of the primary subview having high confidence in the primary confidence map; and
- selecting, for inclusion in the virtual view, one or more regions of the secondary subview having higher confidence in the secondary confidence map than corresponding regions of the primary confidence map.

29. The system of claim 28, wherein:
the plurality of cameras comprises:
- a first plurality of cameras, each of which has a first resolution; and
- a second plurality of cameras, each of which has a second resolution lower than the first resolution; and the light-field camera system is further configured to capture the video data by:
- capturing the primary subview with one of the first plurality of cameras; and
- capturing the secondary subview with one of the second plurality of cameras.

30. The system of claim 29, wherein:
the plurality of cameras further comprises a third plurality of cameras, each of which has a third resolution lower than the second resolution;
the light-field camera system is further configured to capture the video data by capturing the tertiary subview with one of the third plurality of cameras.

* * * * *